(12) United States Patent
Mohammed

(10) Patent No.: US 12,460,070 B2
(45) Date of Patent: Nov. 4, 2025

(54) METHOD OF PREPARING A COMPOSITE COATED SUBSTRATE

(71) Applicant: KING FAHD UNIVERSITY OF PETROLEUM AND MINERALS, Dhahran (SA)

(72) Inventor: Abdul Samad Mohammed, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 526 days.

(21) Appl. No.: 18/166,276

(22) Filed: Feb. 8, 2023

(65) Prior Publication Data

US 2024/0262991 A1    Aug. 8, 2024

(51) Int. Cl.
| | |
|---|---|
| C08L 23/06 | (2006.01) |
| C08K 11/00 | (2006.01) |
| C23C 4/02 | (2006.01) |
| C23C 4/04 | (2006.01) |
| C23C 4/12 | (2016.01) |

(52) U.S. Cl.
CPC .............. *C08L 23/06* (2013.01); *C08K 11/00* (2013.01); *C23C 4/02* (2013.01); *C23C 4/04* (2013.01); *C23C 4/12* (2013.01); *C08L 2207/068* (2013.01)

(58) Field of Classification Search
CPC .......... C08L 23/06; C08L 21/00; C08L 21/02; C08L 2207/068; C23C 4/04
See application file for complete search history.

(56) References Cited

U.S. PATENT DOCUMENTS

| | | | |
|---|---|---|---|
| 6,534,147 B2 | 3/2003 | Gopalan | |
| 11,433,422 B2 | 9/2022 | Uwais et al. | |
| 2004/0006170 A1* | 1/2004 | Haftka | ..................... C08L 21/00 524/515 |
| 2019/0276651 A1* | 9/2019 | Erdman | ..................... C08L 9/06 |
| 2020/0188952 A1* | 6/2020 | Uwais | ..................... A61L 27/303 |
| 2020/0317946 A1* | 10/2020 | Samad | ................. C09D 123/06 |

FOREIGN PATENT DOCUMENTS

| | | |
|---|---|---|
| CN | 103660397 B | 10/2015 |
| CN | 107281544 A | 10/2017 |
| WO | 2011/073534 A1 | 6/2011 |

OTHER PUBLICATIONS

Orndorff, Journal of Tribology, Jan. 2000, vol. 122, p. 367-373 (Year: 2000).*

(Continued)

*Primary Examiner* — Robert C Boyle
(74) *Attorney, Agent, or Firm* — Oblon, McClelland, Maier & Neustadt, L.L.P.

(57) ABSTRACT

A method of forming a composite coated substrate including: dispersing crumb rubber particles in a solvent to form a dispersion, mixing an ultra-high molecular weight polyethylene (UHMWPE) into the dispersion and evaporating the solvent to form a composite, where the crumb rubber particles are dispersed in a matrix of the UHMWPE, and electrospraying at least one layer of the composite onto a surface of a substrate to form the composite coated substrate.

20 Claims, 26 Drawing Sheets

(56) References Cited

OTHER PUBLICATIONS

Samad, et al.; Effect of Air-Plasma Pre-treatment of Si Substrate on Adhesion Strength and Tribological Properties of a UHMWPE Film; Journal of Adhesion Science and Technology, vol. 24, Issue 15-16; Apr. 2, 2012; Abstract Only; 2 Pages.
Asheichik, et al.; Optimization of the Form and Size of the Rubber Coating for Sheaves Lifting Equipment; Proceedings of the $6^{th}$ International Conference on Industrial Engineering (ICIE 2020); Abstract Only; 2 Pages.

\* cited by examiner

Agglomerates of Crumb Rubber Particles

METHOD OF PREPARING A COMPOSITE COATED SUBSTRATE

BACKGROUND

Technical Field

The present disclosure is directed to coatings, particularly to a method of preparing an ultra-high molecular weight polyethylene (UHMWPE) composite coating with crumb rubber.

Description of Related Art

The "background" description provided herein is to generally present the context of the disclosure. Work of the presently named inventors, to the extent it is described in this background section, as well as aspects of the description that may not otherwise qualify as prior art at the time of filing, are neither expressly nor impliedly admitted as prior art against the present invention.

Polymer coatings are thin layers of a polymer applied to either flat substrates or irregular objects. The polymer coatings can be functional (adhesives, photographic films), protective (anticorrosion), or decorative (paint), or modify surfaces (paper coatings, hydrophobic coatings). The operating envelope of a polymer coating is determined by a factor called the PV factor, which is a product of the maximum contact pressure (P) and the maximum sliding speed (V) that the coating can sustain without failure. This measurement can also include the maximum temperature (T) that the polymer coating can withstand before failure, which makes it a PVT factor. The higher this factor, the bigger the operational envelope of the polymer coatings. Research has been carried out to improve this factor to make the polymer coatings suitable for demanding applications, such tribological applications including automotive bearings, and gears, by trying to increase either of these individual factors (P, V, T), which would result in an increase in the overall PVT factor.

The most commonly developed polymer coatings and composites for demanding tribological applications include, polyetheretherketone (PEEK), polytetrafluoroethylene (PTFE), epoxy, polyamide, and ultra high molecular weight polyethylene (UHMWPE). However, among the above, UHMWPE, which is termed a tribologist's polymer because of its low friction, high wear resistance, and high impact strength, has shown promising results to be used in tribological applications. Researchers have attempted to improve the properties of UHMWPE by reinforcing it with fillers such as carbon nanotubes, graphene, nanoclay and alumina. However, various factors such as cost, lack of availability, long fabrication and dispersion procedures, need of functionalization, and health hazards of the above-mentioned fillers, prevents these fillers from being used on a large scale. Therefore, alternatives, which are economically viable, easily dispersed without any further functionalization and widely available are desired.

Crumb rubber is a direct by-product of recycling scrapped rubber tires. The rubber from the tires is initially separated from the steel belts and fibers and is shredded into small pieces followed by crushing cryogenically to form the crumb rubber Crumb rubber has properties such as enhanced resistance to breaking when stretched, high plasticity and high abrasion resistance. However, the potential of the crumb rubber as a reinforcement in polymer coatings for tribological applications has not been thoroughly investigated.

Therefore, it is one object of the present disclosure to develop a UHMWPE coating with a crumb rubber filler having a high loading capacity and high wear resistance. It is another object of the present disclosure, to provide a route for recycling of crumb rubber.

SUMMARY

In an exemplary embodiment, a method of forming a composite coated substrate is described. The method includes dispersing crumb rubber particles in a solvent to form a dispersion; mixing an ultra-high molecular weight polyethylene (UHMWPE) into the dispersion and evaporating the solvent to form a composite. Electrospraying at least one layer of the composite onto a surface of a substrate to form the composite coated substrate. The crumb rubber particles are dispersed in a matrix of the UHMWPE on the surface of the substrate. At least one layer has a thickness of 1-500 micrometers (um).

In some embodiments, the substrate is subjected to an air-plasma treatment prior to coating.

In some embodiments, the substrate is made from a material selected from the group consisting of titanium, gold, cobalt, tantalum, chromium, nickel, and mild steel.

In some embodiments, the composite consists of the UHMWPE and the crumb rubber particles.

In some embodiments, the UHMWPE has an average particle size of 10-500 um.

In some embodiments, the UHMWPE has a molecular weight (Mw) of at least 1,000,000 g/mol.

In some embodiments, the composite comprises crumb rubber-UHMWPE particles wherein the UHMWPE is interpenetrated with a surface of the crumb rubber particles, and contain a core of crumb rubber particles representing from 0.8 to 0.95 of the total thickness of the crumb rubber-UHMWPE particles.

In some embodiments, the crumb rubber particles have an average particle size of 150-250 um.

In some embodiments, the crumb rubber particles are not agglomerated in the composite coated substrate.

In some embodiments, the composite includes 0.1-25 weight % (wt %) of the crumb rubber particles based on a total weight of the crumb rubber particles and the UHMWPE.

In some embodiments, the composite includes 5-15 wt % of the crumb rubber particles based on a total weight of the crumb rubber particles and the UHMWPE.

In some embodiments, the surface of the composite coated substrate is hydrophilic.

In some embodiments, the composite coated substrate has a hardness of at least 8 gigapascals (GPa).

In some embodiments, the composite coated substrate has a hardness of 10-20 GPa.

In some embodiments, the composite coated substrate has a maximum normal load of 15 newton (N).

In some embodiments, the composite coated substrate can withstand up to 100,000 cycles at a load of 15 N and at a sliding speed of 0.1 meter per speed (m/s).

In some embodiments, the method further includes heating the crumb rubber particles to a temperature of 100-300 degrees centigrade (° C.) prior to forming the dispersion where heating forms microcracks on the surface of the crumb rubber particles.

In some embodiments, the UHMWPE has a polybranched structure and where at least one branch of the polybranched structure penetrates a microcrack of the crumb rubber particles in the composite.

In some embodiments, at least one branch of the polybranched structure penetrates the microcrack of the crumb rubber particles at a depth of 1-500 nanometers (nm) in the composite.

In some embodiments, the solvent is evaporated to form the composite by sonicating and by heating to a temperature 5-20° C. greater than the boiling point of the solvent.

The foregoing general description of the illustrative present disclosure and the following The detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
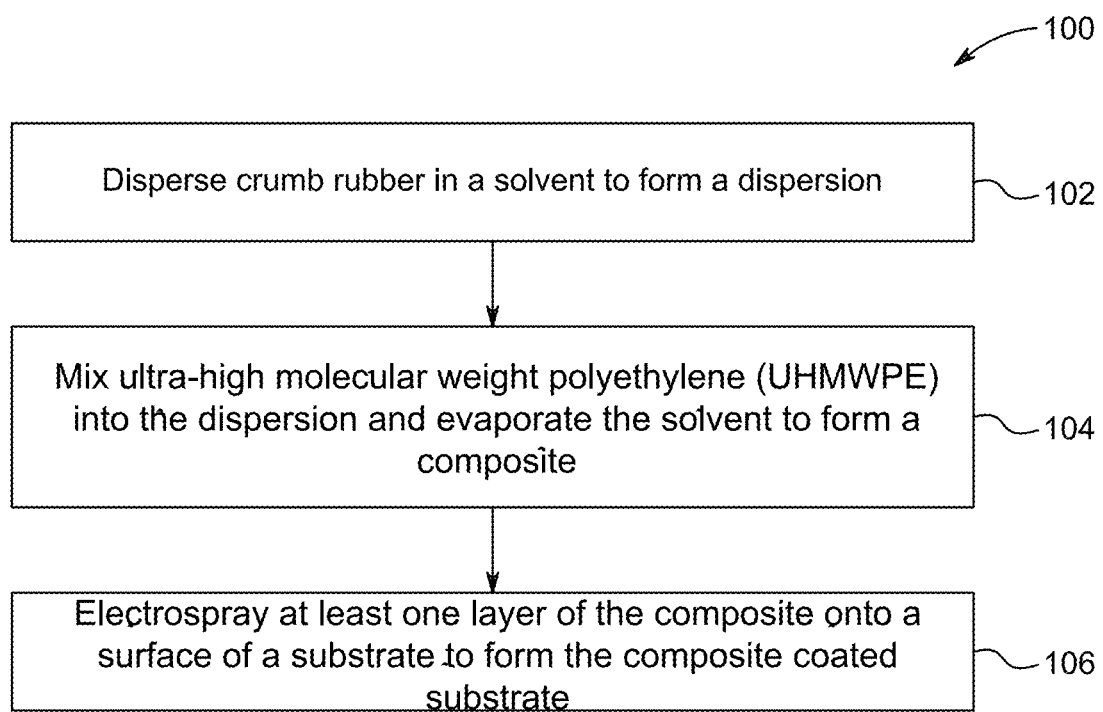
FIG. 1 is a schematic flow diagram of a method of forming a composite coated substrate, according to certain embodiments.

In the drawings, reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

All ranges disclosed herein are inclusive of the endpoints, and the endpoints are independently combinable with each other, and inclusive of all intermediate values of the ranges. Thus, ranges articulated within this disclosure, e.g. numerics/values, shall include disclosure for possession purposes and claim purposes of the individual points within the range, sub-ranges, and combinations thereof.

As used herein, the term "composite" refers to a mixture of two materials.

As used herein, the term "substrate" refers to the base on which coating is done.

As used herein, the term "electrospraying" refers to a process in which a high electric potential is used to atomize a liquid solution containing a material into a spray of charged microdroplets. Rapid solvent evaporation from the droplets renders a spray of charged dry particles that are directed onto a target substrate. In the case of this disclosure, the material is the composite.

As used herein, the term "hydrophilic" refers to a tendency to mix with, dissolve in, or be wetted by water.

Embodiments of the present disclosure are directed toward a method of forming an ultra-high molecular weight polyethylene (UHMWPE) based composite coating reinforced with crumb rubber. The composite of the present disclosure is a combination of a low-cost filler, namely, crumb rubber explored as a reinforcement, which is an abundantly available material constituting a major portion of waste. The composite coatings reinforced with different loadings of the crumb rubber were deposited on a substrate using an electrostatic spray coating technique. Mechanical and tribological properties of the composite coatings were evaluated using a microhardness testing and a ball-on-disc sliding wear tests, respectively.

Referring to FIG. 1, a schematic flow diagram of the method 100 for forming a composite coated substrate is illustrated. The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

At step 102, the method 100 includes dispersing crumb rubber (CR) particles in a solvent to form a dispersion. In some embodiments, the solvent may be polar or non-polar. In some embodiments, the non-polar solvent may be benzene, hexane, pentane, etc. In some embodiments, the polar solvent may be water. In a preferred embodiment, the solvent is an alcohol, such as ethanol or isopropyl alcohol. In some embodiments, the crumb rubber is dispersed in the solvent by magnetic stirring and/or sonication for a time range of 5-30 minutes, preferably 15-25 minutes, and more preferably for about 20 minutes. In a preferred embodiment, the sonication may be carried out using a probe sonicator with a 25/5 s ON/OFF cycle for 20 minutes. The purpose of sonication is to ensure uniform and homogenous dispersion of the crumb rubber particles in the solvent, i.e. there are no aggregates or clumps of crumb rubber particles.

In an embodiment, the crumb rubber is obtained from automotive and truck scrap tires. In an embodiment, the crumb rubber is a powder. In some embodiments, the crumb rubber particles present in the composite coated substrate have an average particle size of less than 300 um. In some embodiments, the crumb rubber has an average particle size of 100-300 um, preferably 150-250 um, or approximately 200 um. The crumb rubber particles can have any shape, selected from the group consisting of irregular, triangular, spherical, or cubic. An irregular shape is the shape produced during processing of the tires as previously described. The particles may be further shaped by cutting into a triangular, spherical, or cubic shape.

At step 104, the method 100 includes mixing UHMWPE into the dispersion and evaporating the solvent to form a composite. The amount of the crumb rubber particles, in the step 102, are varied relative to the amount of UHMWPE to be added. In some embodiments, the composite has 0.1-25 weight % (wt %), preferably 1-20, 3-18, 5-15, 8-12, or approximately 10 wt % of the crumb rubber particles based on a total weight of the crumb rubber particles and the UHMWPE. In some embodiments, the mixing of the UHMWPE and crumb rubber is with magnetic stirring or by sonicating.

In some embodiments, the UHMWPE has an average particle size of 10-500 um, preferably 50-450 um, 100-400 um, 150-350 um, 200-300 um, or approximately 250 um. In some embodiments, the UHMWPE has a molecular weight (Mw) of at least 500,000 g/mol preferably 700,000 g/mol, 800,000 g/mol, 900,000 g/mol, 1,000,000 g/mol, 1,200,000 g/mol, 1,500,000 g/mol, or 2,000,000 g/mol. In some embodiments, the UHMWPE is linear. In a preferred embodiment, the UHMWPE has a polybranched structure, for example, positions on the UHMWPE have a branching substituent. There may be more than one type of branching substituent on the UHMWPE. The branching substituent may be but is not limited to a straight or branched alkyl chain with 1 to 100 carbon atoms, a carboxylic acid group with 1 to 100 carbon atoms, or a linear or branched aliphatic amine with 1 to 100 carbon atoms. In another embodiment, the UHMWPE is crosslinked by subjecting it to electron beam irradiation, gamma irradiation, or x-ray irradiation, causing chain scissions of the individual polyethylene molecules as well as the breaking of C—H bonds to form free radicals on the polymer chains, resulting in radicals on adjacent polymer chains bonding together to form crosslinked UHMWPE.

In some embodiments, the crumb rubber particles may optionally be heated to a temperature of 100-300° C., preferably 150-250° C., or approximately 200° C. prior to its immersion in the solvent in step 102. The heating forms microcracks on a surface of the crumb rubber particles. The microcracks can penetrate from the surface into a core of the crumb rubber particles. In some embodiments, the microcracks penetrate less than 50%, preferably 40%, 30%, 20%, or 10% of the distance from the surface of the crumb rubber particle to the center of the crumb rubber particle. In other words, if a crumb rubber particle has a radius of 100 um, the microcrack has a 50 um depth or less.

The formation of microcracks allows for the penetration of the UHMWPE into the crumb rubber to form crumb rubber-UHMWPE particles. In some embodiments, the UHMWPE has a polybranched structure and where at least one branch of the polybranched structure penetrates a microcrack of the crumb rubber in the composite. In some embodiments, at least one branch of the polybranched structure penetrates the microcrack of the crumb rubber at a depth of 1-500 nanometers (nm), preferably 50-450 nm, 100-400 nm, 150-350 nm, or 200-300 nm in the composite. In some embodiments, crumb rubber particles consist of a core of crumb rubber representing from 0.8 to 0.95 the total thickness of the crumb rubber particles present in the composite coated substrate and an outer layer comprising a mixture of UHMWPE interpenetrated into the crumb rubber. In an embodiment, the crumb rubber-UHMWPE particles consist of 95% of a core of crumb rubber particle and 5% of interpenetrated UHMWPE on a surface of the crumb rubber particle.

In a preferred embodiment, a chain of the UHMWPE penetrates multiple different crumb rubber particles at the same time. In other words, the poly branched UHMWPE penetrates a first crumb rubber particle with one branching unit and another crumb rubber particle with another branching unit, thereby forming a network of interconnected crumb rubber particles in a matrix of UHMWPE. In some embodiments, at least 10% of the composite is crumb rubber-UHMWPE particles, i.e. at least 10% of the crumb rubber particles has interpenetrated UHMWPE, preferably 20%, 30%, 40%, 50%, 60%, 70%, 80%, 90%, or 100%. This also prevents the formation of aggregates of the crumb rubber particles. In some embodiments, particles of the crumb rubber are not agglomerated in the composite.

In some embodiments, the solvent is evaporated naturally. In some embodiments, the solvent is evaporated by heating and/or blowing a stream of nitrogen or argon gas. In a preferred embodiment, the solvent is rapidly evaporated by simultaneously sonicating and heating the mixture of the UHMWPE and the crumb rubber particles. In an embodiment, the heating is to a temperature 5-20° C. greater, preferably 10 to 15° C. greater than the boiling point of the solvent. For example, if the solvent in ethanol, the mixture is heated to approximately 90° C. while under sonication, to evaporate the solvent. By rapidly evaporating the solvent with heating and sonication it allows the polybranched UHMWPE to penetrate the microcracks in the crumb rubber particles, due to the high agitation of the mixture. Both heating and sonicating form a high percentage (>50%) of crumb rubber-UHMWPE particles. Following, evaporation of the solvent, in some embodiments, the composite consists of the UHMWPE and the crumb rubber particles.

At step 106, the method 100 includes electrospraying at least one layer of the composite onto a surface of a substrate to form the composite coated substrate. The composite in the composite coated substrate has substantially the same properties as previously described. In some embodiments, the substrate is made from a material selected from the group consisting of titanium, gold, cobalt, tantalum, chromium, nickel, and mild steel. In a preferred embodiment, the substrate is steel. In an embodiment, the substrate may be any size or shape. In an embodiment, 1 to 100 layers of the composite are electrosprayed onto the substrate, preferably 10-90, 20-80, 30-70, 40-60, or approximately 50 layers. The layers cover at least 50% of the substrate, preferably 60%, 70%, 80%, 90%, or 100%. The composite coated substrate layers have a thickness of 1-500 um, preferably 10-450 um, 30-400 um, 50-300 um, 80-250 um, or 10-200 um. In some embodiments, the substrate is subjected to an air-plasma treatment prior to coating. This process helps to improve adhesion of the coating to the substrate.

In some embodiments, the wettability of the composite coated substrate can be determined by measuring the water contact angle (WCA). Higher WCA values indicate lower wettability of the surface. In general, a WCA of greater than 90° is considered to be hydrophobic. In some embodiments, the surface of the composite coated substrate is hydrophilic. In some embodiments, the surface of the composite coated substrate has a WCA or less than 80°, preferably less than 75°, or less than 70°.

In some embodiments, the composite coated substrate has a hardness of at least 8 gigapascals (GPa), preferably a hardness of 10-20 GPa, or 12-15 GPa. In some embodiments, the hardness of the composite coated substrate increases with increased loading of crumb rubber. The composite coated substrate has a higher hardness value than the substrate without a layer of the composite.

In some embodiments, the composite coated substrate has a maximum normal load of 15 N, preferably 10-15 N, 11-14 N, or 12-13 N. Further, the composite coated substrate can withstand up to 100,000 cycles at a load of 15 N and at a sliding speed of 0.1 meter per speed (m/s). Failure of the composite coated substrate is determined by the presence of iron in the EDX spectrum, visual inspection of the wear track and the absence of a scar mark on the counterface ball, as described in the Examples.

EXAMPLES

The following examples demonstrate a method of forming a composite coated substrate, as described herein. The examples are provided solely for illustration and are not to be construed as limitations of the present disclosure, as many variations thereof are possible without departing from the spirit and scope of the present disclosure.

Example 1: Materials and Substrate

UHMWPE in form with an average particle size of 80 microns was procured from Goodfellow Co, UK. The particles of a crumb rubber (80 mesh size) were procured from Saudi Rubber Products Co. Circular mild steel coupons of 25 millimeters (mm) diameter with a thickness of 5 mm were selected as substrates for depositing the composite coating.

Example 2: Preparation of Nanocomposite Coatings

Prior to the deposition of the UHMWPE composite coatings, the UHMWPE nanocomposite powders with different loadings (5, 10 and 15 wt %) of the crumb rubber were prepared. The samples are labeled throughout as UHMWPE/x wt %, where x is 5, 10 or 15, based on the amount of crumb rubber dispersed in the UHMWPE. Initially, the weighed amount of the crumb rubber powder according to the wt % selected was dispersed in 50 milliliters (ml) of alcohol using a probe sonicator (Sonics, USA) with a 25/5 s ON/OFF cycle for 20 minutes. After sonication, the required amount of the UHMWPE powder was added to this solution and subjected to magnetic stirring for 30 minutes followed by heating the mixture to a temperature of 60 degrees centigrade (° C.) to obtain dry composite powders after the complete evaporation of alcohol.

A Craftsman® electrostatic spray gun was used to spray the composite powders on pre-treated steel samples. Prior to polymer coating, the substrates were ground/polished to obtain a uniform roughness, which was further subjected to cleaning with acetone and dried with nitrogen to remove any debris particles. The substrates were further subjected to an air-plasma treatment for 10 minutes using a Harrick plasma cleaner (manufactured by Harrick Plasma, USA) at a radio frequency (RF) power of 30 watts (W), which was reported to significantly improve the adhesion between the substrate and the coating. The plasma treated substrates were further heated to a temperature of 180° C., for 5 minutes on a heating plate prior to the actual spraying of the composite powders on it. After the spraying of the composite powders, the coated samples were left on the heating plate at 180° C. for 35 minutes and then were allowed to cool down at room temperature in air for further evaluation.

Example 3: Hardness Measurements

A micro-combo hardness tester (CSM Instruments®, USA) was used to measure the hardness of the UHMWPE composite coatings. A normal load of 0.2 N was applied for 10 s with a constant loading and unloading rate of 0.4 N/min with the help of a pyramidal shaped diamond indenter. Ten readings on each sample at different locations were taken, and the average value was reported. It is made sure that the penetration depth was less than 10% of the coating thickness to avoid substrate effect during indentation.

Example 4: Coating Thickness Measurements

The thickness of all the UHMWPE composite coatings was measured using an Elcometer 456 gauge fitted with an FNF (ferrous/non-ferrous) probe. Prior to measurements, the gauge is calibrated by 480 micrometers (μm) foils, using smooth calibration approach to keep errors during measurement within ±1%. Five readings were taken on each coating and the average value was reported. The thickness of the UHMWPE composite coatings reinforced with the different loadings (5, 10 and 15 wt %) of the crumb rubber was observed to be in the range of 140±10 μm.

Example 5: Water Contact Angle Measurements

The change in wettability of the developed UHMWPE composite coatings reinforced with different wt % of crumb rubber was evaluated by measuring the water contact angle (WCA) of the UHMWPE composite coatings. A goniometer (VCA Optima, United States of America (USA)) was used to measure the WCA using a 0.5 microliters (μl) droplet of distilled water. A total of 5 measurements were conducted for each sample, and the average value was reported.

Example 6: Tribological Testing

A tribometer (UMT-3 tribometer, Bruker USA) with a ball on disk configuration was used to conduct a wear test to evaluate a wear resistance and a friction coefficient of the developed UHMWPE composite coatings. An alumina ball of 6.3 mm diameter was used as a counterface. Different normal loads were used to test the wear life of the UHMWPE composite coatings at a constant sliding speed of 0.1 m/s. Three tests were conducted on each coating type for repeatability. A 3D Optical profilometer (GTK-A, Bruker, USA) was used to evaluate the wear depth of the UHMWPE composite coatings after the wear tests. The wear mechanisms of the UHMWPE composite coatings were evaluated by conducting scanning electron microscopy (SEM; Tescan, USA).

Figure 2:
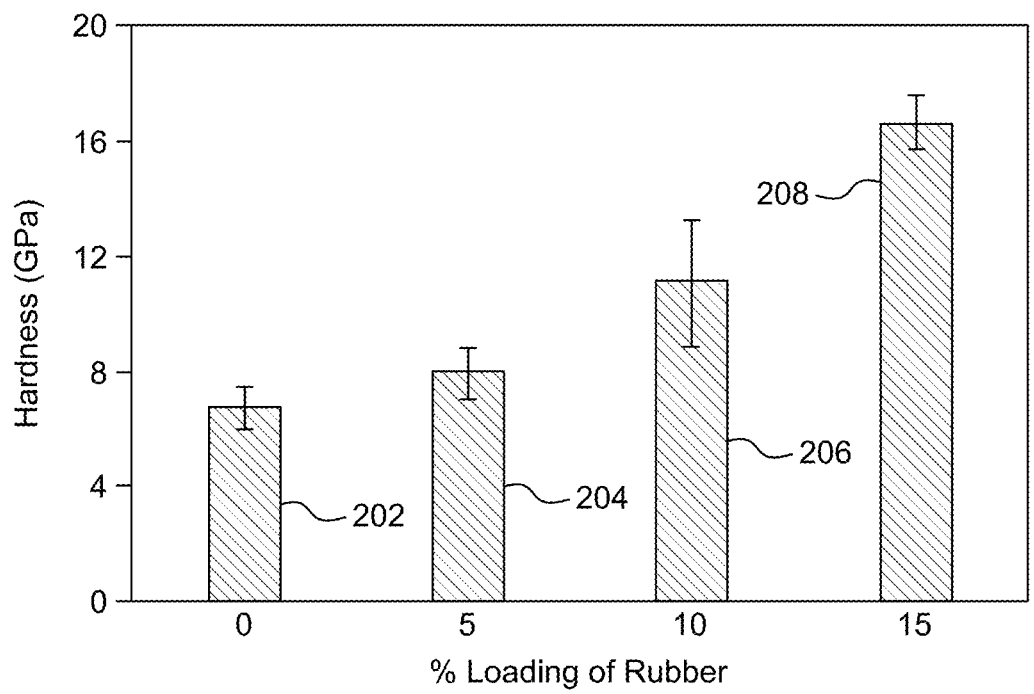
FIG. 2 is a plot illustrating a variation of hardness of an ultra-high molecular weight polyethylene (UHMWPE) composite coating with varying wt % of crumb rubber particles, according to certain embodiments.

Example 7: Effect of Crumb Rubber Loading on the Hardness of the Composite Coatings For this purpose, three different configurations of the UHMWPE composite coatings were fabricated using 5, 10, and 15 wt % of the crumb rubber loadings, respectively. FIG. 2 shows the variation in the hardness of the UHMWPE composite coatings with the amount of the crumb rubber. The 0% (202) loading of rubber shows less hardness than 5% (204), and 10% (206). As can be observed, the hardness of the UHMWPE composite coatings continuously increased with an increase in the % loading of the crumb rubber. The highest hardness is observed with the 15% (208) loading of rubber.

Figure 3:
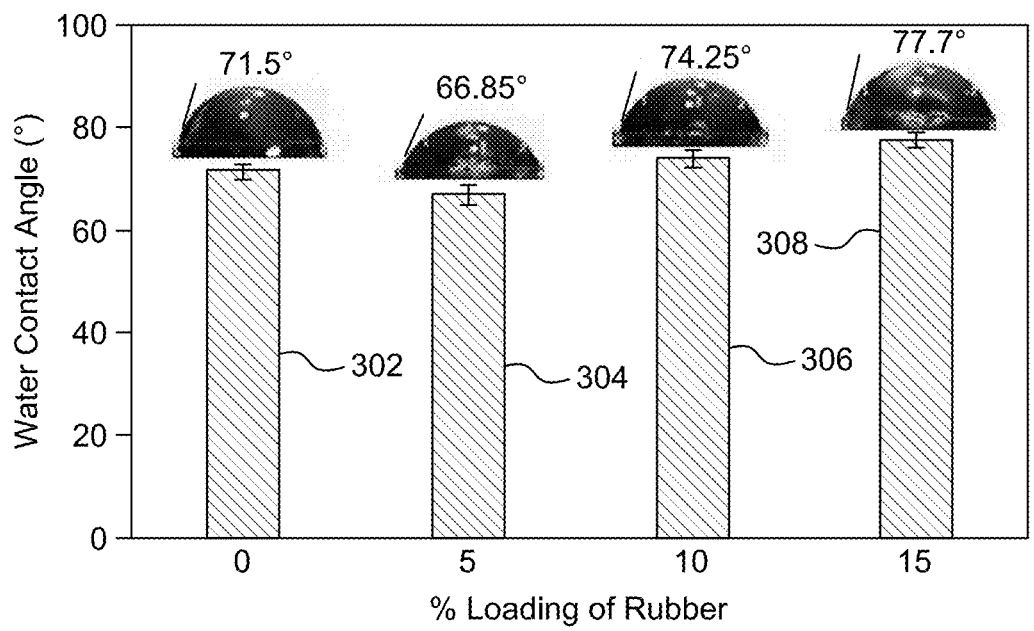
FIG. 3 is a plot depicting a variation of water contact angle (WCA) with percentage loading of crumb rubber, according to certain embodiments.

Example 8: Effect of Crumb Rubber Loading on the Wettability of the Composite Coatings Wettability of the contacting surfaces plays a role in determining the tribological performance. One of the ways to estimate the wettability of the surfaces is by measuring the WCA of the surfaces. The higher the WCA, the lower is the wettability of the surface. In general, a WCA of greater than 90° is considered to be hydrophobic. FIG. 3 shows the variation of the WCA with increasing loading of the crumb rubber. As can be observed from FIG. 3, the crumb rubber concentration did not have a significant effect on the WCA of the UHMWPE composite coatings. An increase in the different concentrations of the loading of crumb rubber showed a marginal increase. 0% (302), 5% (304), 10% (306), and 15% (308) effectively highlight the relation of the crumb rubber against WCA.

Example 9: Effect of the Crumb Rubber Loading on the Load Bearing Capacity of the Composite Coatings The load bearing capacity of the developed UHMWPE composite coatings reinforced with different loadings of crumb rubber was evaluated. The initial load that the samples in the current disclosure were tested was 15 N, to evaluate if the crumb rubber reinforcement will result in an enhanced load bearing capacity of the UHMWPE composite coating. Hence, to start with, the UHMWPE composite coating reinforced with 5 wt % of the crumb rubber was tested at a load of 15 N and a linear speed of 0.1 m/s for a duration of 10,000 cycles.

Figure 4A:
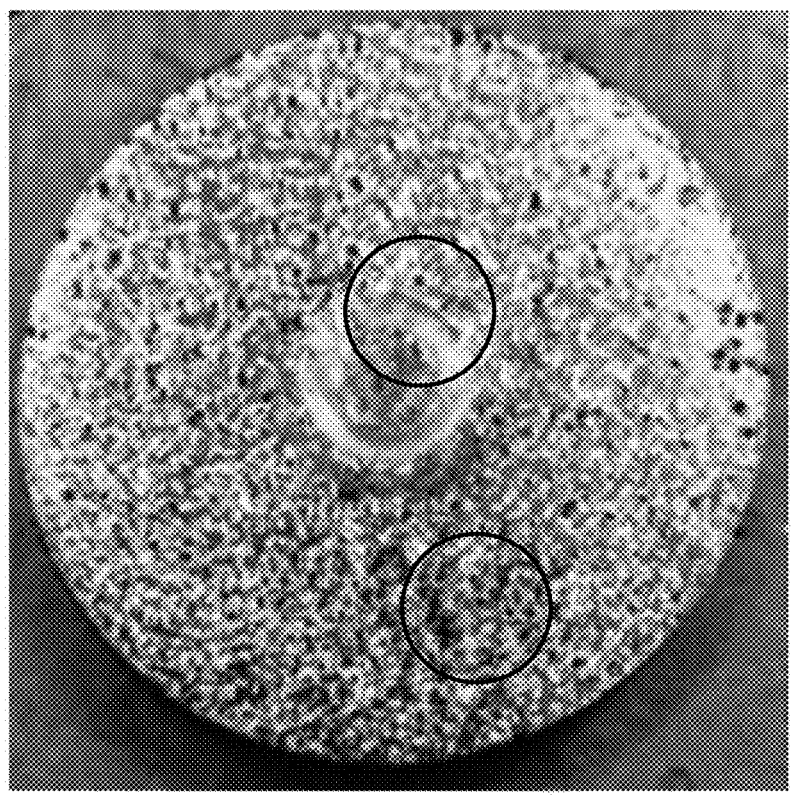
FIG. 4A illustrates a photograph of a wear track of a tested sample with 5 wt % crumb rubber at 15 N and a linear speed of 0.1 m/s for a duration of 10,000 cycles, according to certain embodiments.
Figure 4B:
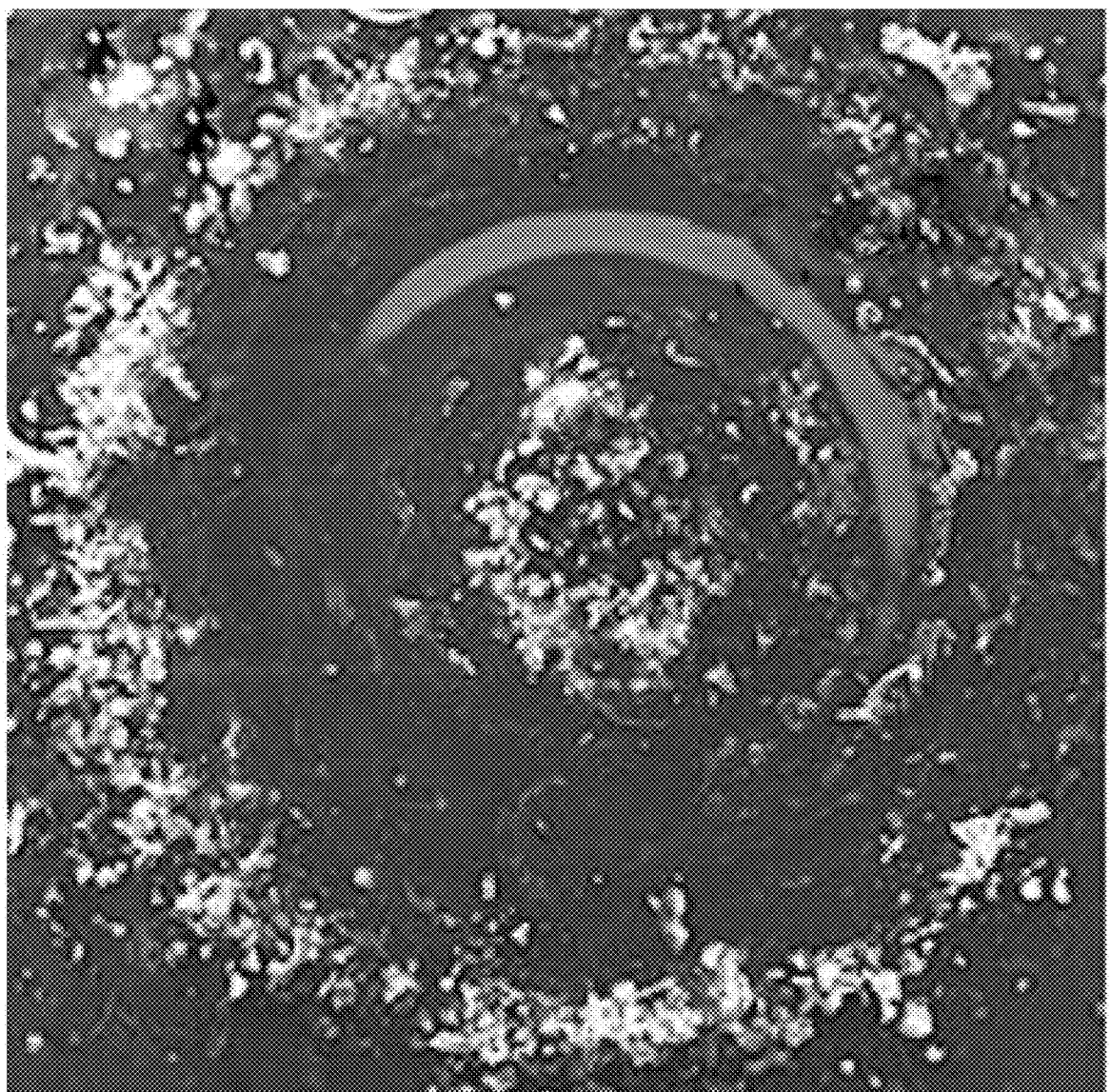
FIG. 4B illustrates a scanning electron microscope (SEM) image of the wear track of FIG. 4A at a magnification of 22×, according to certain embodiments.
Figure 4C:
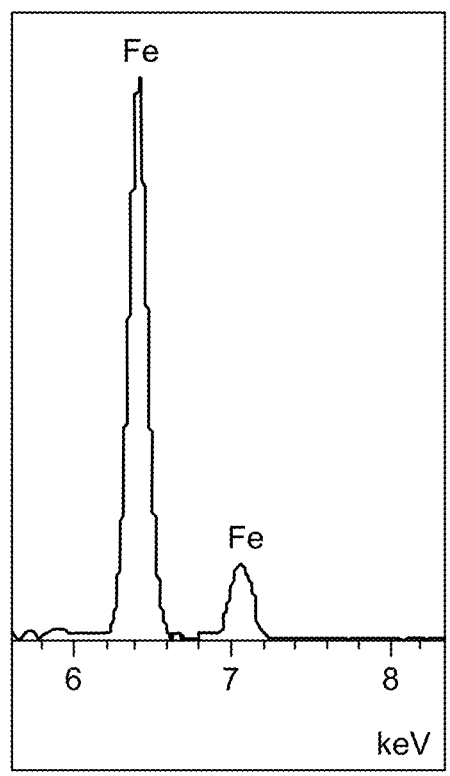
FIG. 4C illustrates an energy-dispersive X-ray (EDX) spectrum of the wear track of FIG. 4A after a wear test, according to certain embodiments.
Figure 4D:
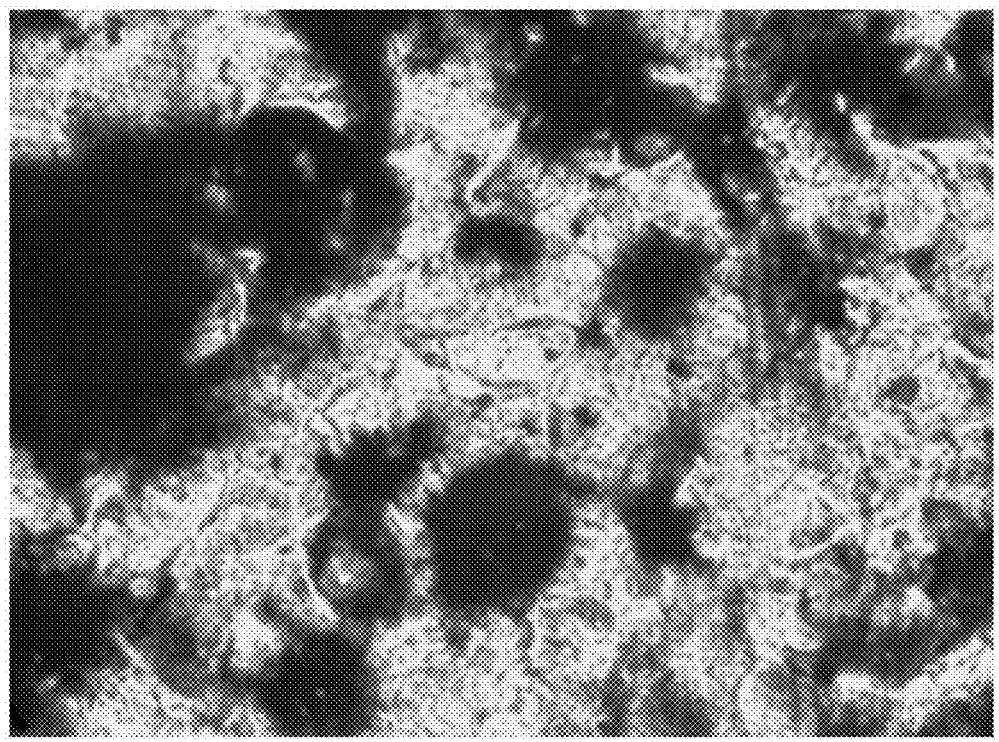
FIG. 4D illustrates an optical image of the 5 wt % crumb rubber coating showing a distribution of the crumb rubber particles, according to certain embodiments.
Figure 4E:
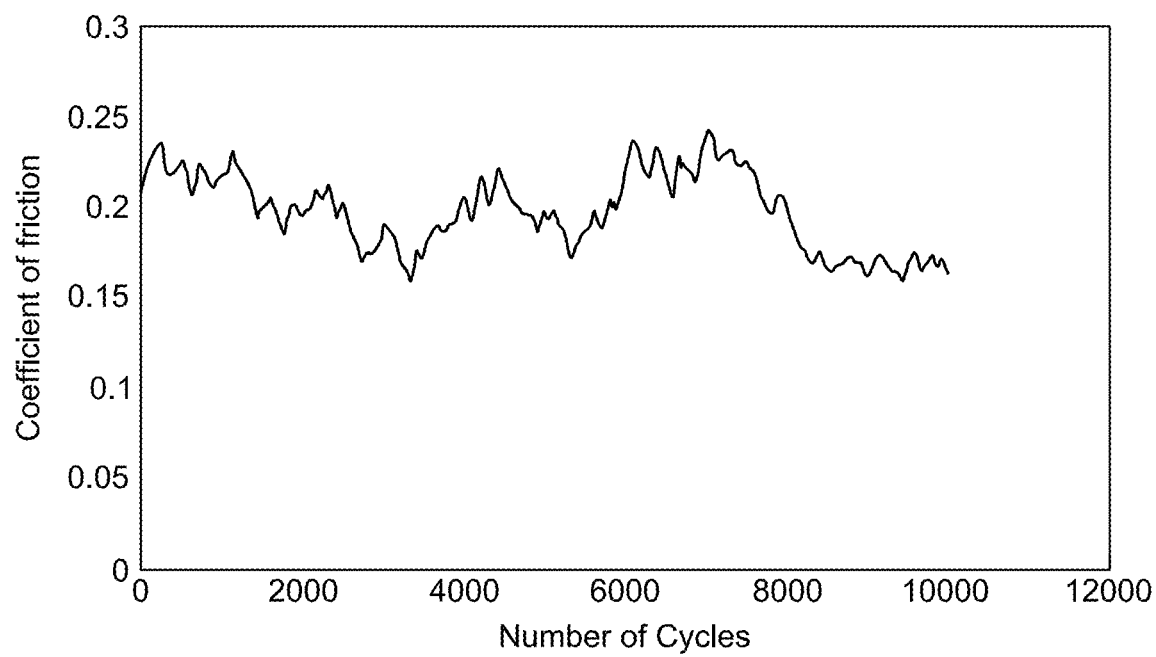
FIG. 4E illustrates a typical frictional plot of a wear test of the 5 wt % crumb rubber coating, according to certain embodiments.
Figure 4F:
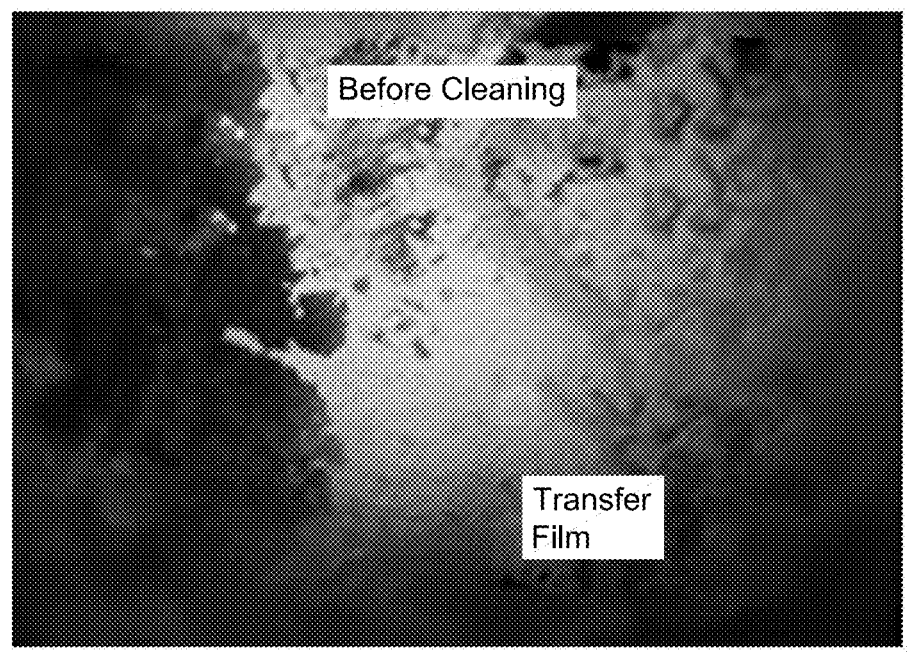
FIG. 4F illustrates an optical image of a counterface ball immediately after the wear test before cleaning of the 5 wt % crumb rubber coating, according to certain embodiments.
Figure 4G:
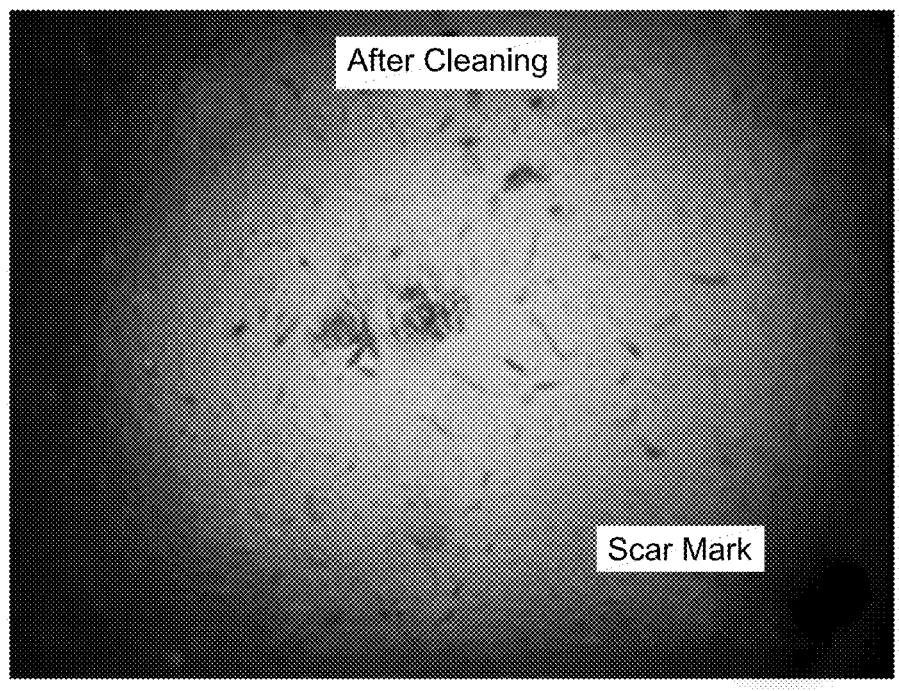
FIG. 4G illustrates an optical image of a counterface ball after the wear test after cleaning for the 5 wt % crumb rubber coating, according to certain embodiments.

FIG. 4A-FIG. 4G show the tested sample with the wear track, an optical image of the UHMWPE/5 wt % crumb rubber coating, the SEM/EDX analysis of the wear track, a typical frictional plot of the test, optical images of the counterface ball after the test, before and after cleaning with acetone, respectively. FIG. 4A shows a photograph of the tested sample with the wear track with visible markings made during the test. FIG. 4B shows SEM image of the wear track at a magnification of 22×, again with visible markings made during the test. FIG. 4C shows an energy-dispersive X-ray EDX spectrum, where a clear peak of iron is visible confirming the failure of the UHMWPE composite coating, which was also seen by the visual inspection of the wear track in FIG. 4A. FIG. 4D shows an optical image of the coating showing the distribution of the crumb rubber particles. The crumb rubber particles in the 5 wt % crumb rubber samples are dispersed throughout the particles of the UHMWPE and do not form agglomerates. FIG. 4E shows a typical frictional plot of the wear test. FIG. 4F shows an optical image of the counterface ball immediately after the wear test before cleaning, showing that composite coating was transferred onto the ball from the substrate surface during the test. FIG. 4G shows the failure of the UHMWPE composite coating was also confirmed by the scar mark on the counterface ball after cleaning signifying a metal-to-metal contact.

Scar marks on the ball and disk in the tribiological testing apparatus indicated that the coating did not have sufficient properties to withstand the load being applied. Therefore, during the wear test the composite coating on the substrate is damaged and/or removed thereby allowing the metal ball to come into contact with the metal of the substrate. The failure can be attributed to the insufficient amount of rubber particles in the UHMWPE composite coating, which resulted in lower hardness of the coating as shown in FIG. 2. Furthermore, it can be observed that the less amount of rubber particles within the polymer matrix is not able to act to effectively anchor the UHMWPE polymer chains, resulting in the easy removal of the polymer coating from the substrate. FIG. 4F confirms by the large amount of material transfer observed on the counterface ball.

Figure 5A:
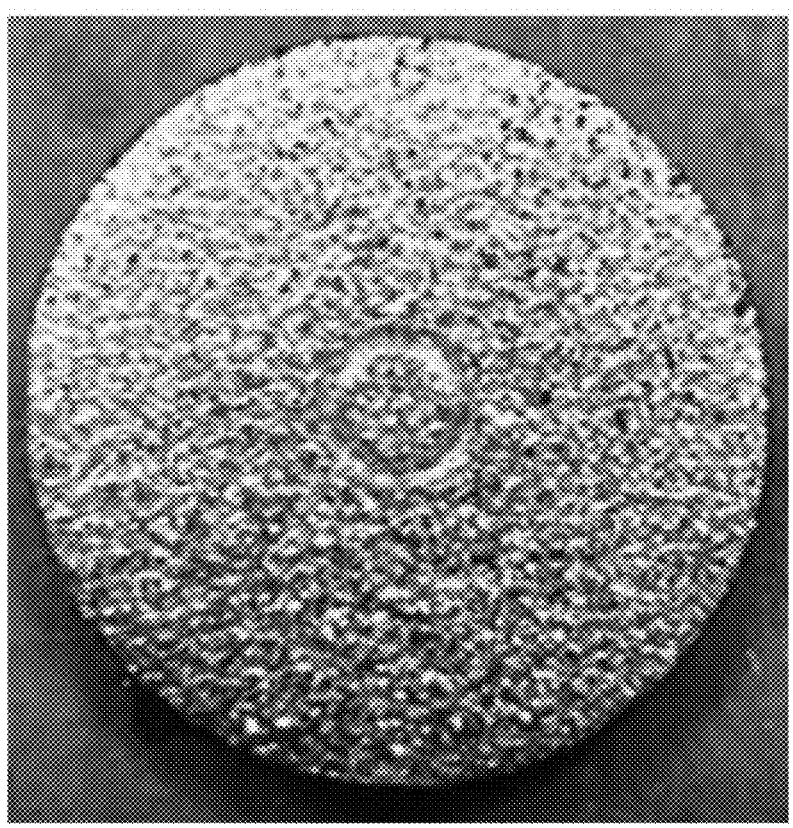
FIG. 5A illustrates a photograph of a wear track of a tested sample with 10 wt % crumb rubber at 15 N and a linear speed of 0.1 m/s for a duration of 10,000 cycles, according to certain embodiments.
Figure 5B:
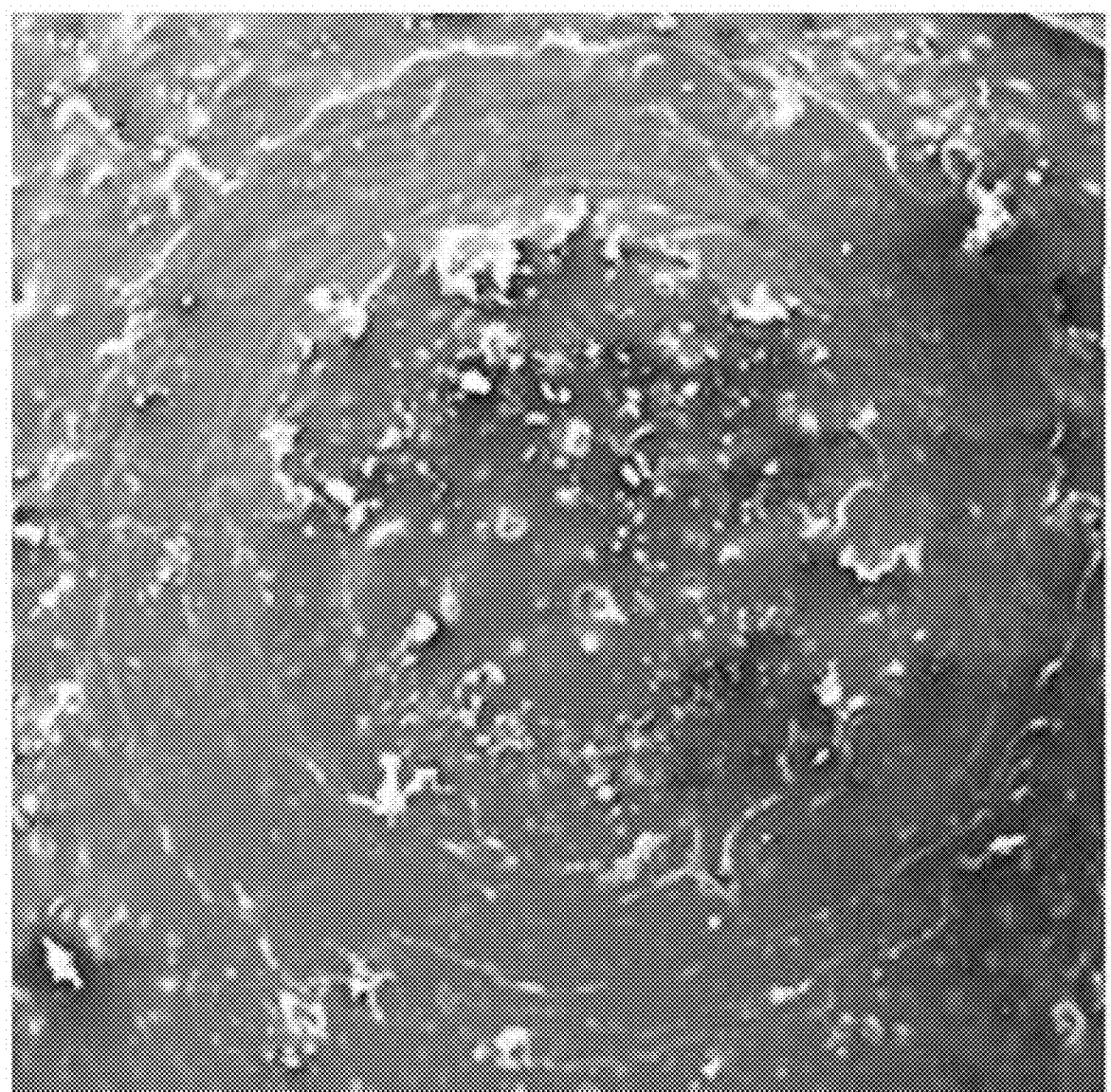
FIG. 5B illustrates a SEM image of the wear track of FIG. 5A at a magnification of 22×, according to certain embodiments.
Figure 5C:
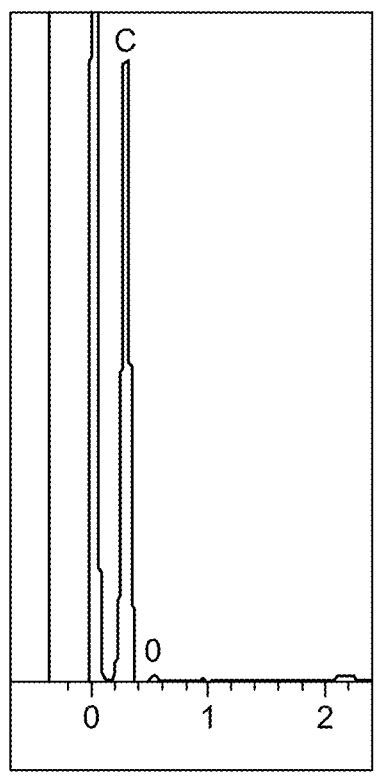
FIG. 5C illustrates an EDX spectrum captured on the wear track of FIG. 5A after the wear test, according to certain embodiments.
Figure 5D:
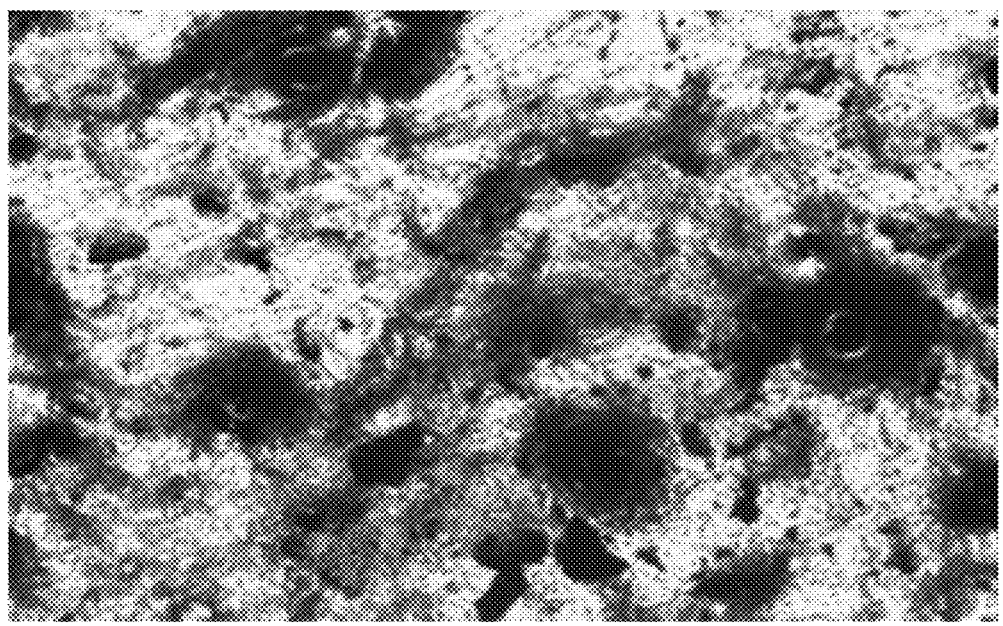
FIG. 5D illustrates an optical image of the 10 wt % crumb rubber coating showing a distribution of the crumb rubber particles, according to certain embodiments.
Figure 5E:
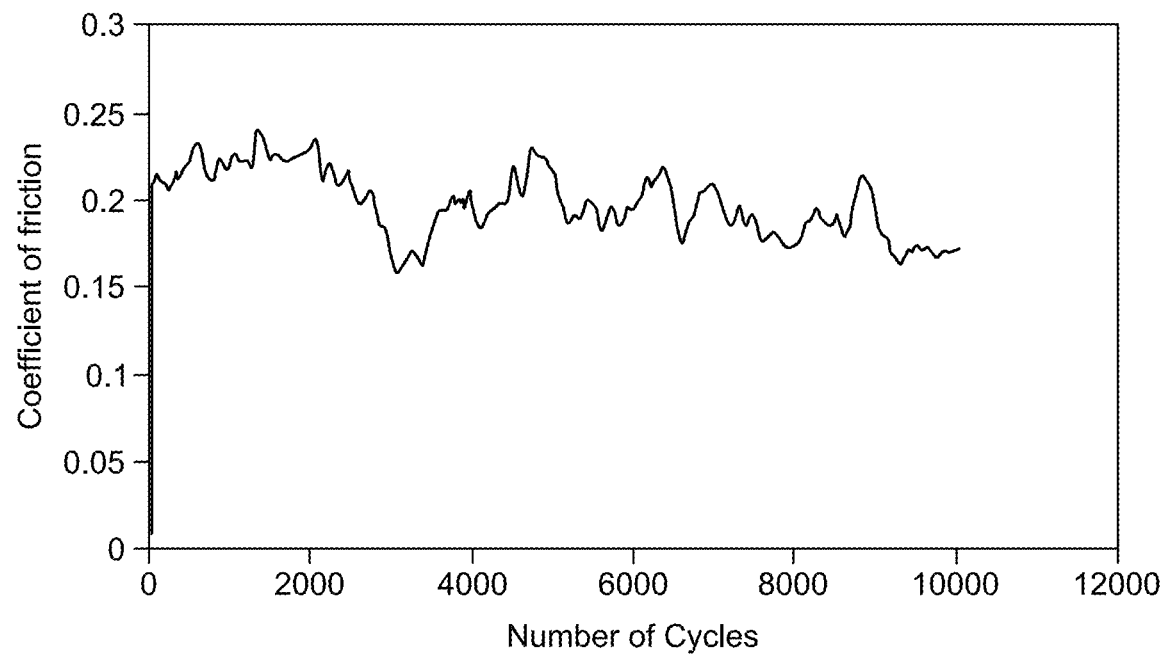
FIG. 5E illustrates a typical frictional plot of a wear test of the 10 wt % crumb rubber coating, according to certain embodiments.
Figure 5F:
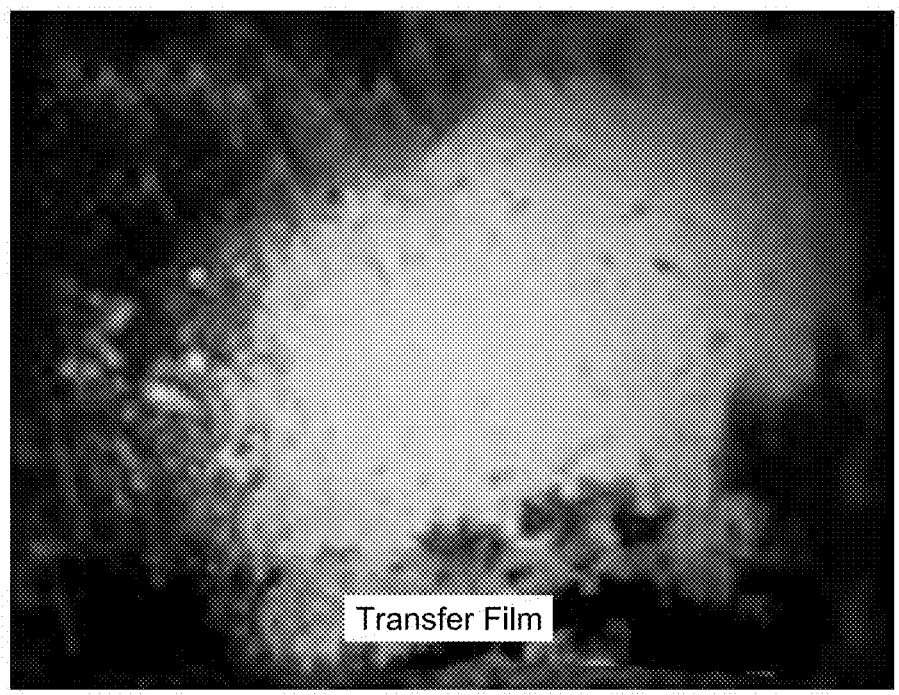
FIG. 5F illustrates an optical image of a counterface ball immediately after the wear test before cleaning for the 10 wt % crumb rubber coating, according to certain embodiments.
Figure 5G:
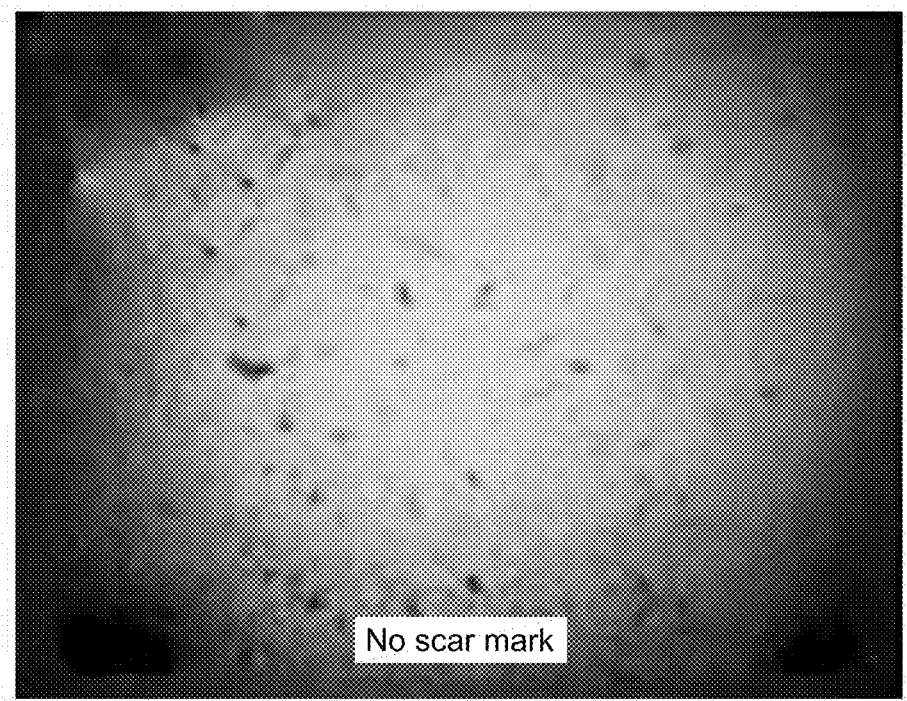
FIG. 5G illustrates an optical image of a counterface ball after the wear test after cleaning for the 10 wt % crumb rubber coating, according to certain embodiments.
Figure 5H:
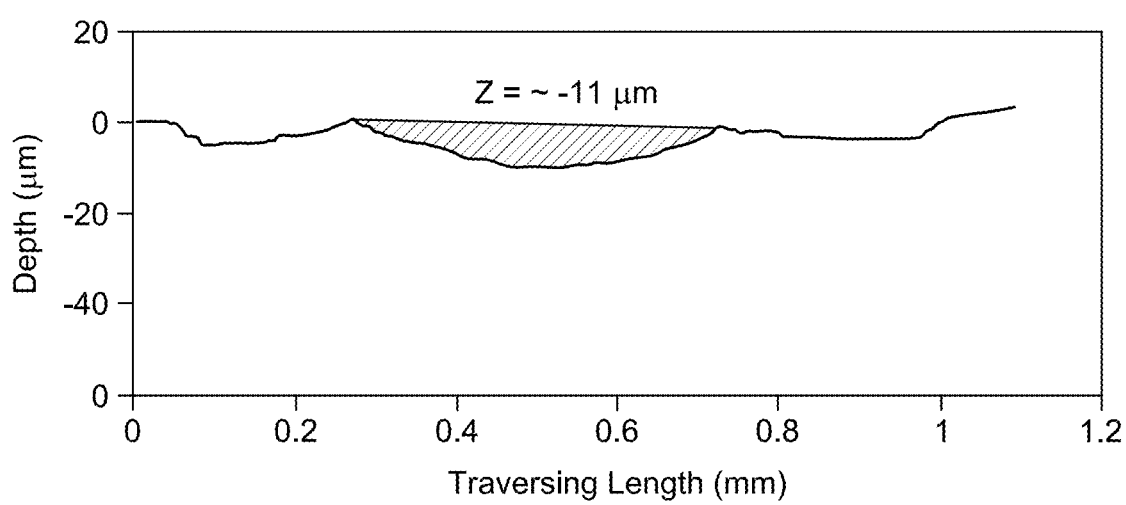
FIG. 5H illustrates a 2-dimensional (2D) profile of the wear track after the test for the 10 wt % crumb rubber coating, according to certain embodiments.
Figure 6A:
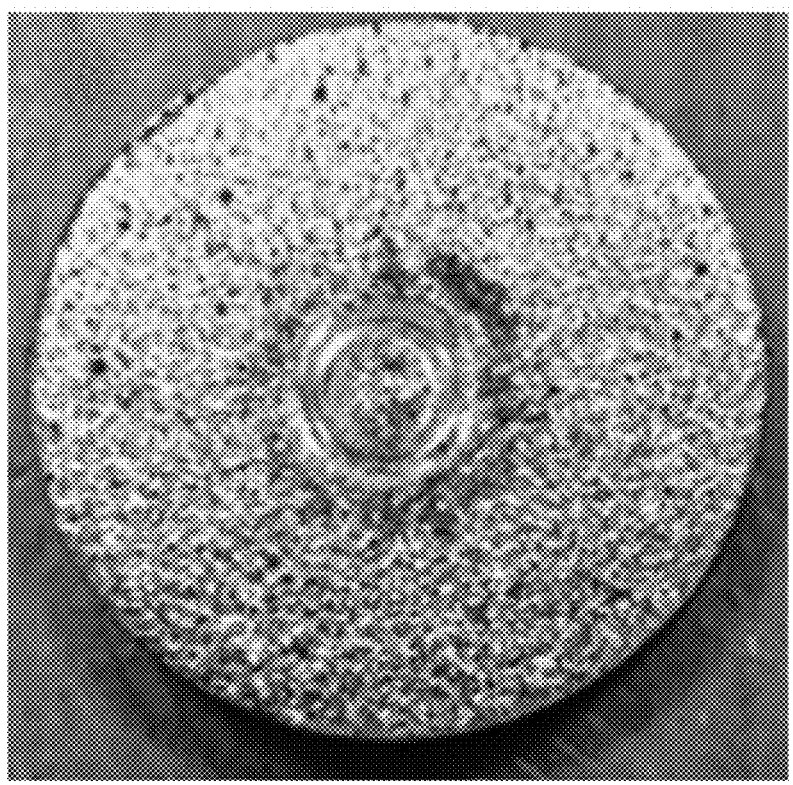
FIG. 6A illustrates a photograph of a wear track of a tested sample with 10 wt % crumb rubber at 17 N and a linear speed of 0.1 m/s for a duration of 10,000 cycles, according to certain embodiments.
Figure 6B:
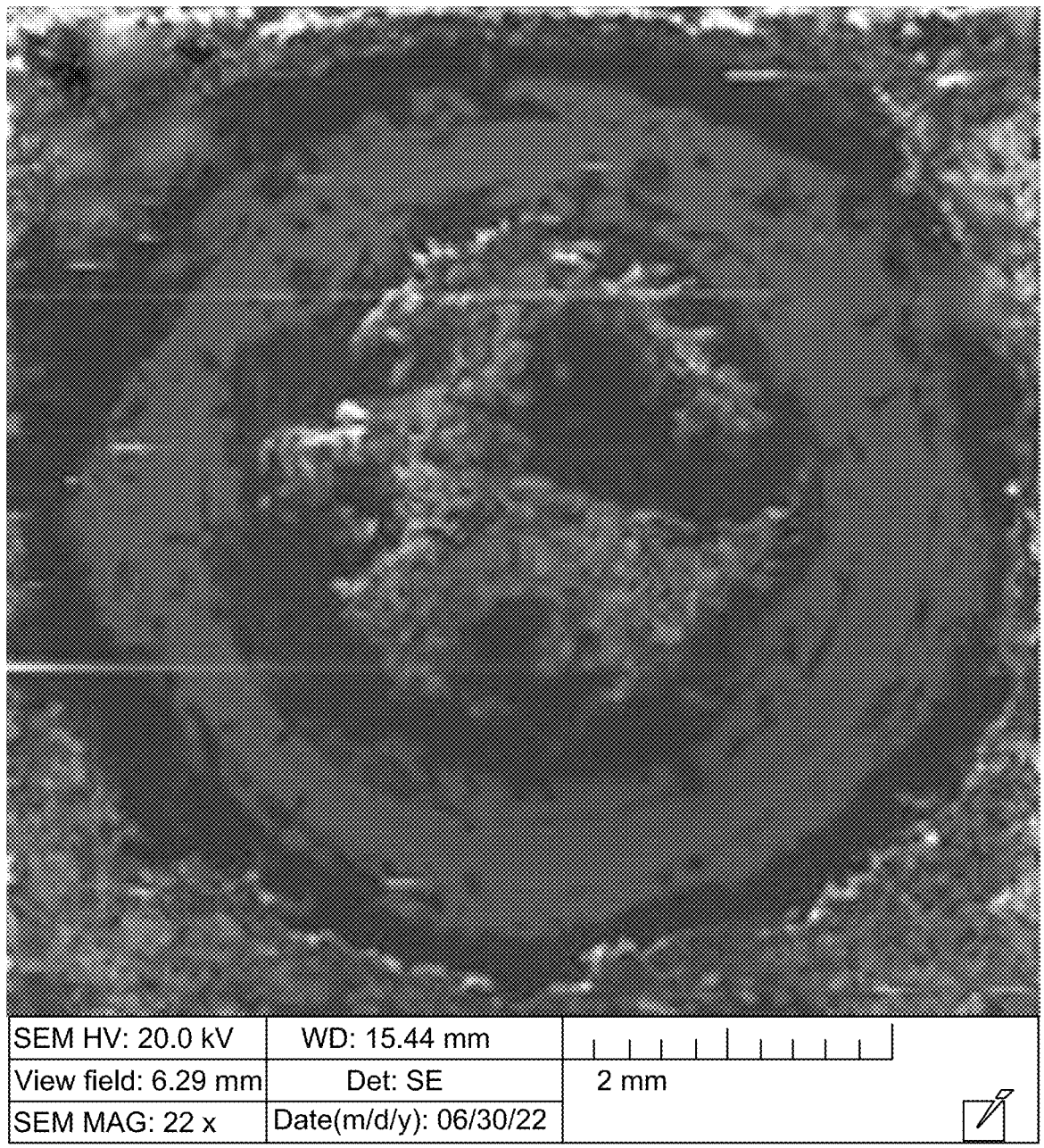
FIG. 6B illustrates a SEM image of the wear track of FIG. 6A at a magnification of 22×, according to certain embodiments.
Figure 6C:
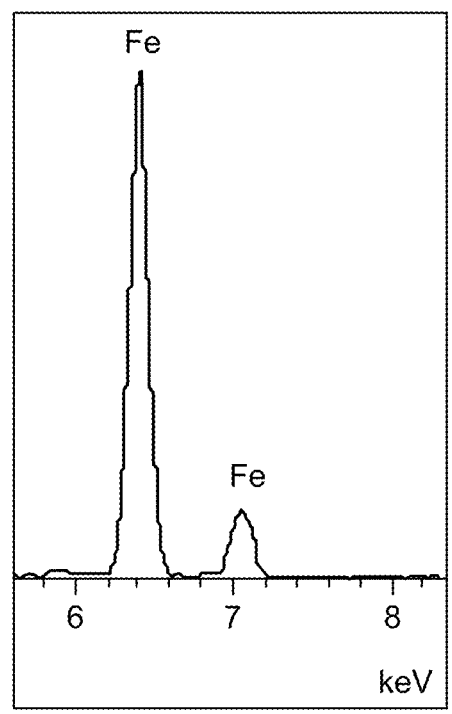
FIG. 6C illustrates an EDX spectrum captured on the wear track of FIG. 6A after the wear test, according to certain embodiments.
Figure 6D:
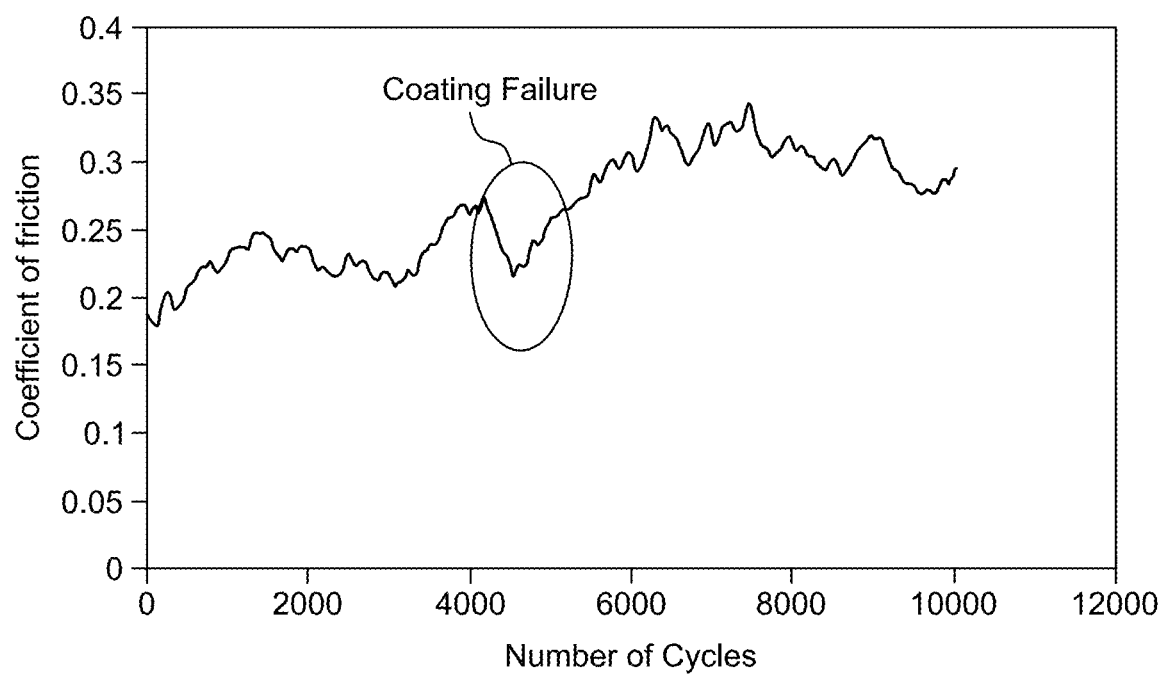
FIG. 6D illustrates a typical frictional plot of a wear test of the 10 wt % crumb rubber coating, according to certain embodiments.
Figure 6E:
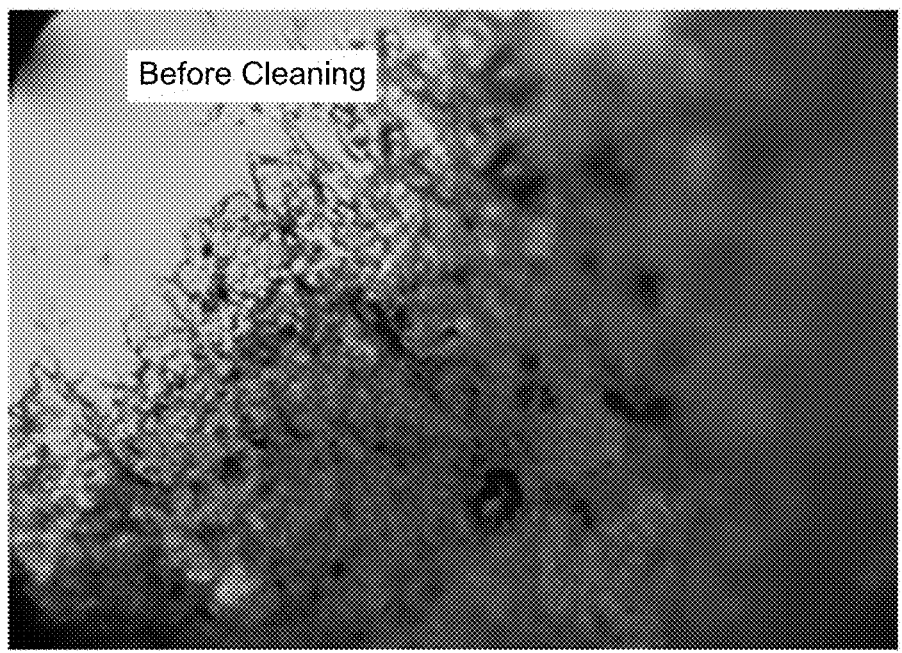
FIG. 6E illustrates an optical image of a counterface ball immediately after the wear test before cleaning for the 10 wt % crumb rubber coating, according to certain embodiments.
Figure 6F:
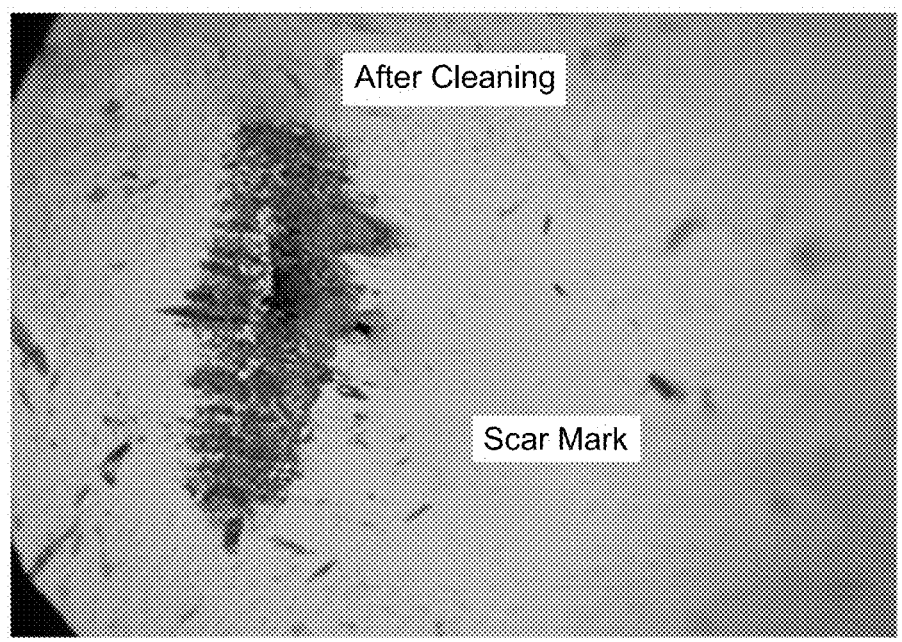
FIG. 6F illustrates an optical image of a counterface ball after the wear test after cleaning for the 10 wt % crumb rubber coating, according to certain embodiments.
Figure 7A:
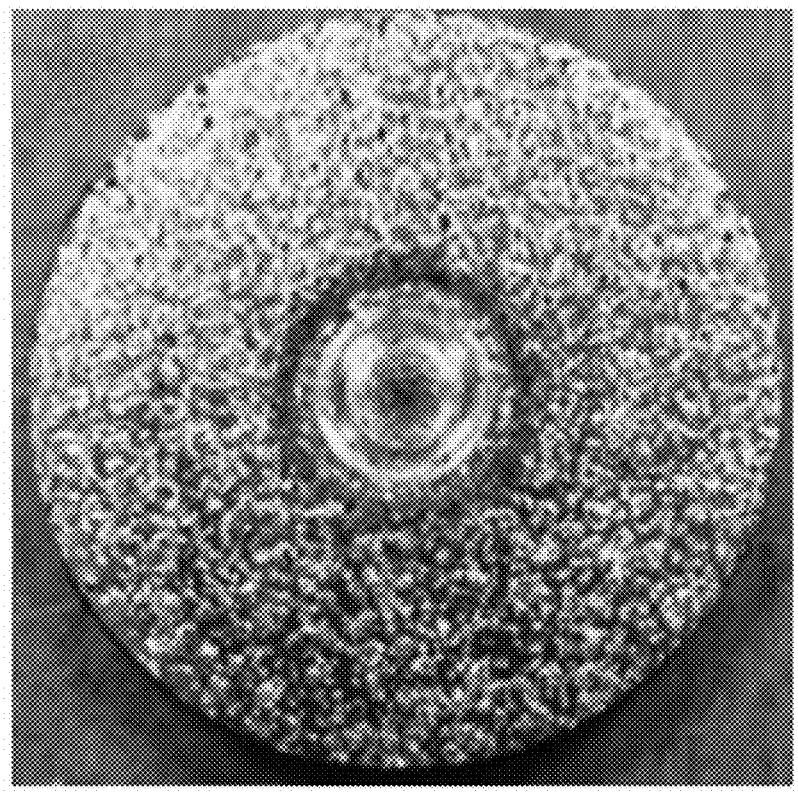
FIG. 7A illustrates a photograph of a wear track of a tested sample with 15 wt % crumb rubber at 17 N and a linear speed of 0.1 m/s for a duration of 10,000 cycles, according to certain embodiments.
Figure 7B:
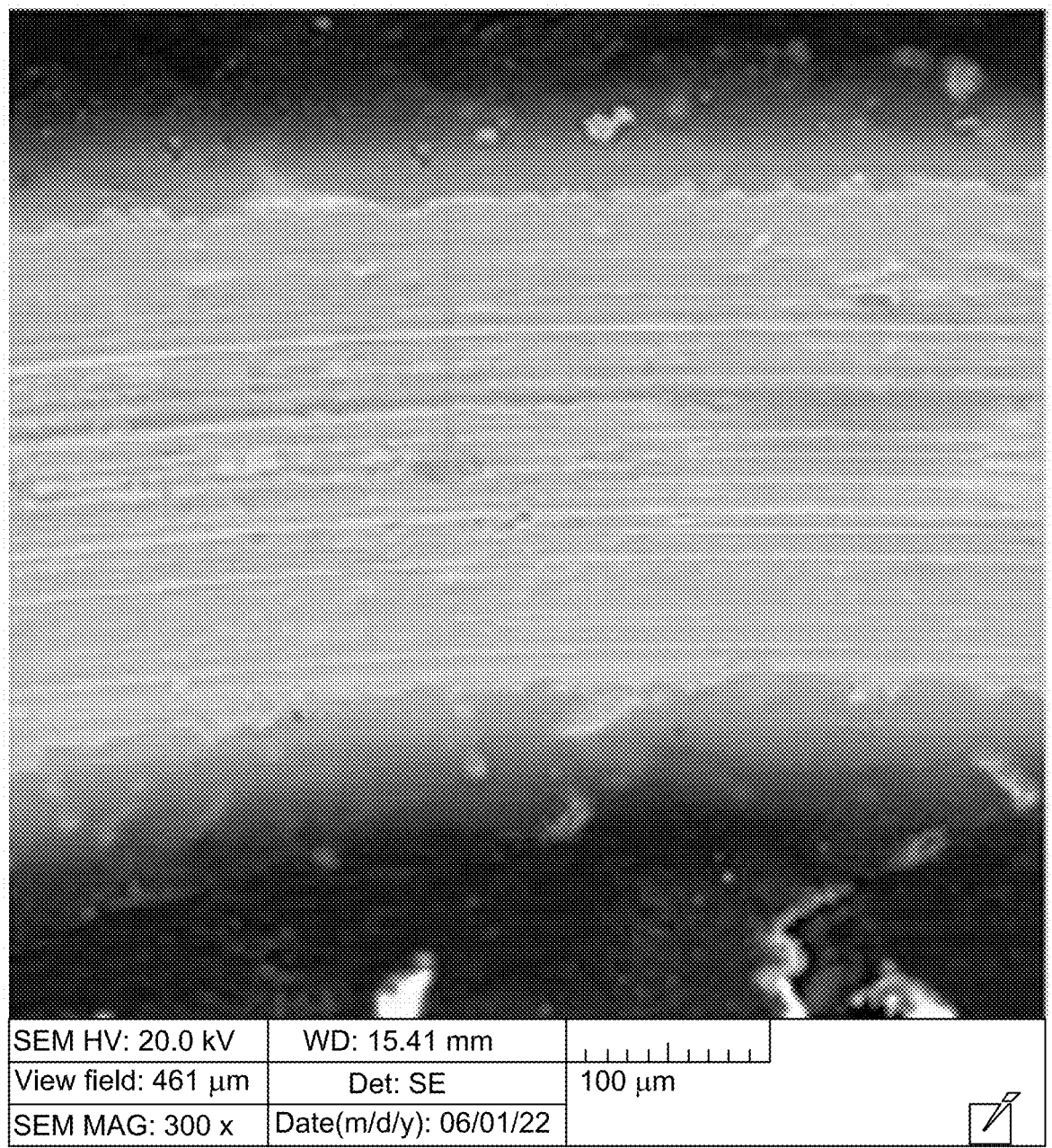
FIG. 7B illustrates a SEM image of the wear track of FIG. 7A at a magnification of 22×, according to certain embodiments.
Figure 7C:
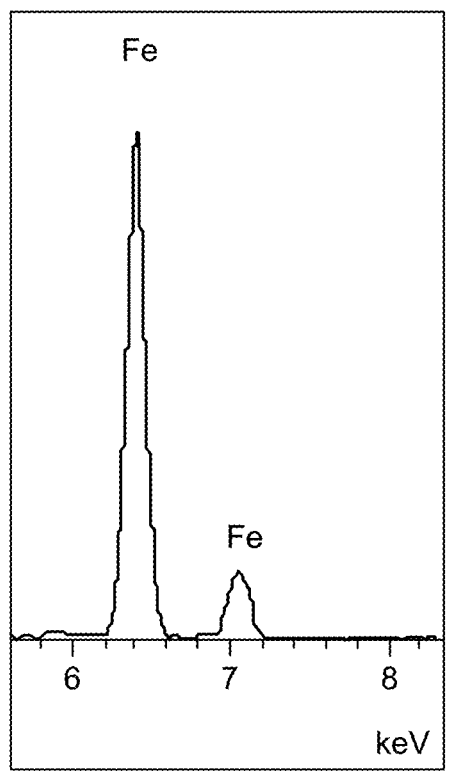
FIG. 7C illustrates an EDX spectrum captured on the wear track of FIG. 7A after the wear test, according to certain embodiments.
Figure 7D:
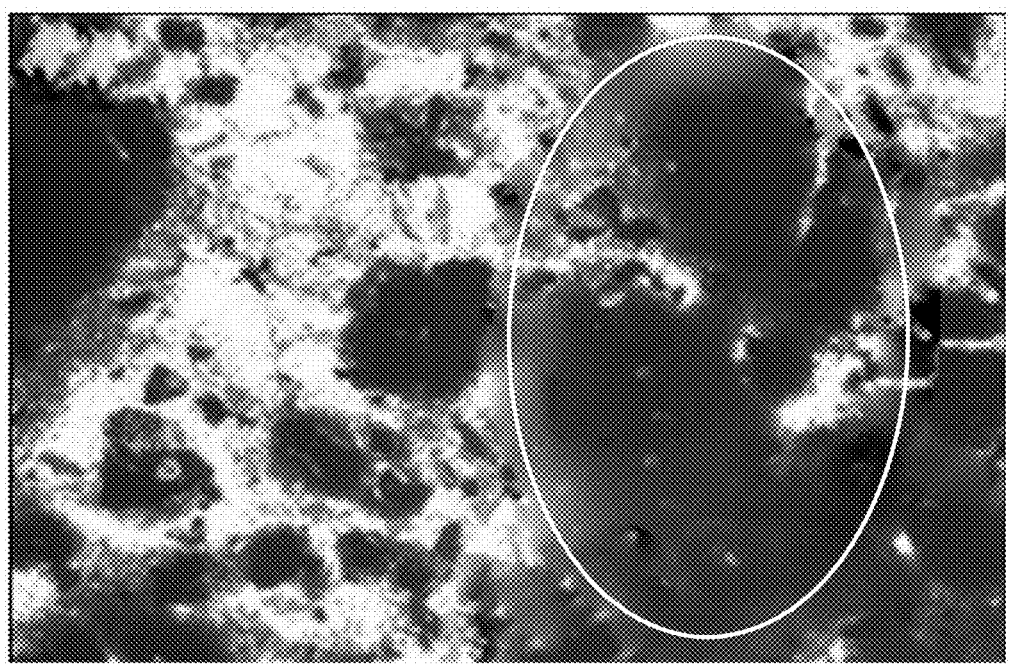
FIG. 7D illustrates an optical image of the 15 wt % crumb rubber coating showing a distribution of the crumb rubber particles, according to certain embodiments.
Figure 7E:
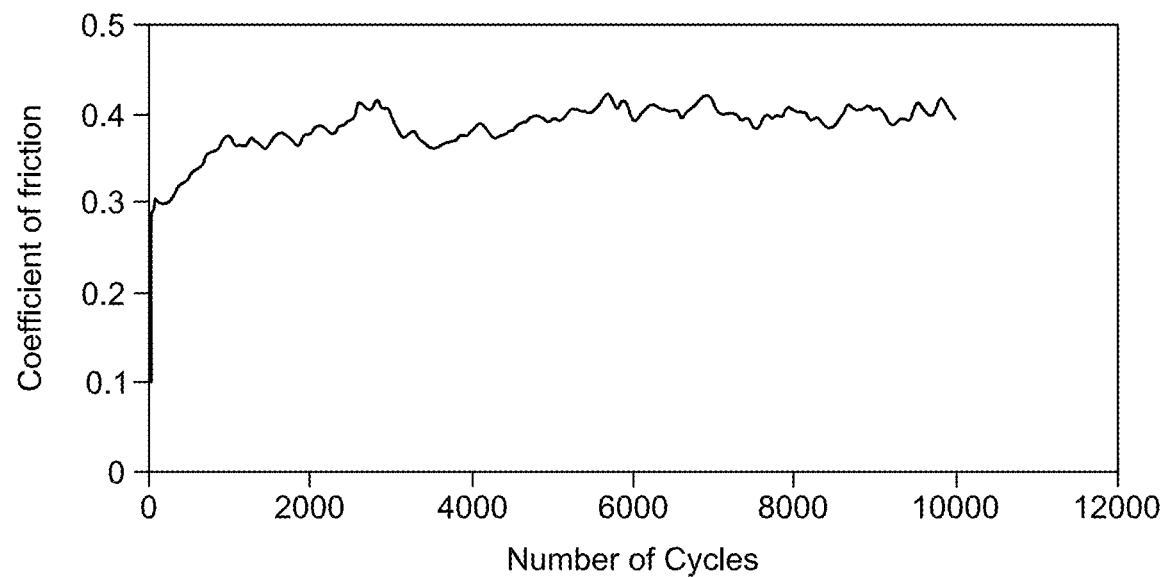
FIG. 7E illustrates a typical frictional plot of a wear test of the 15 wt % crumb rubber coating, according to certain embodiments.
Figure 7F:
FIG. 7F illustrates an optical image of a counterface ball immediately after the wear test before cleaning for the 15 wt % crumb rubber coating, according to certain embodiments.
Figure 7G:
FIG. 7G illustrates an optical image of a counterface ball after the wear test after cleaning for the 15 wt % crumb rubber coating, according to certain embodiments.
Figure 8A:
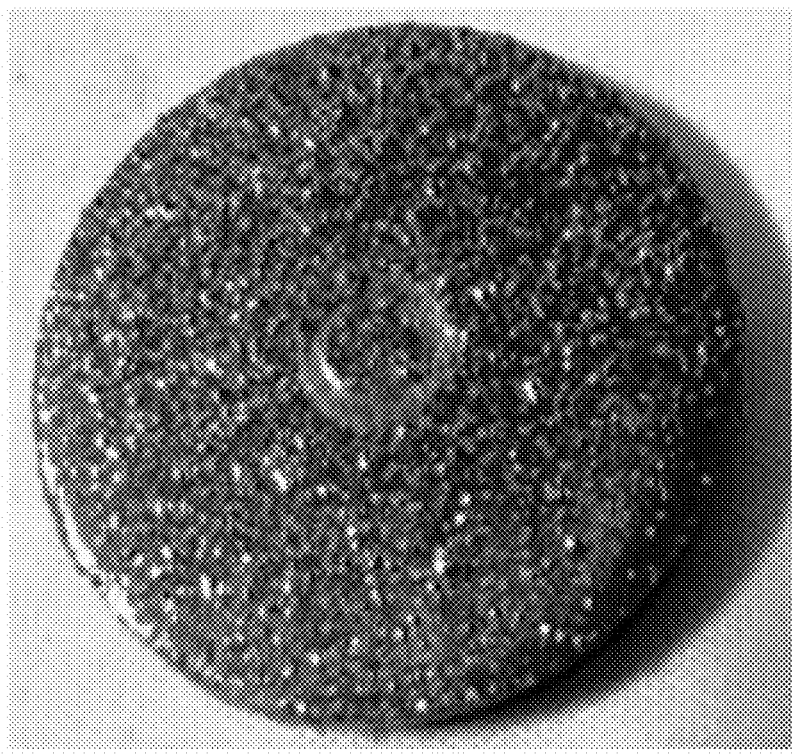
FIG. 8A illustrates a photograph of a wear track of a tested sample with 10 wt % crumb rubber at 15 N and a linear speed of 0.1 m/s for a duration of 100,000 cycles, according to certain embodiments.
Figure 8B:
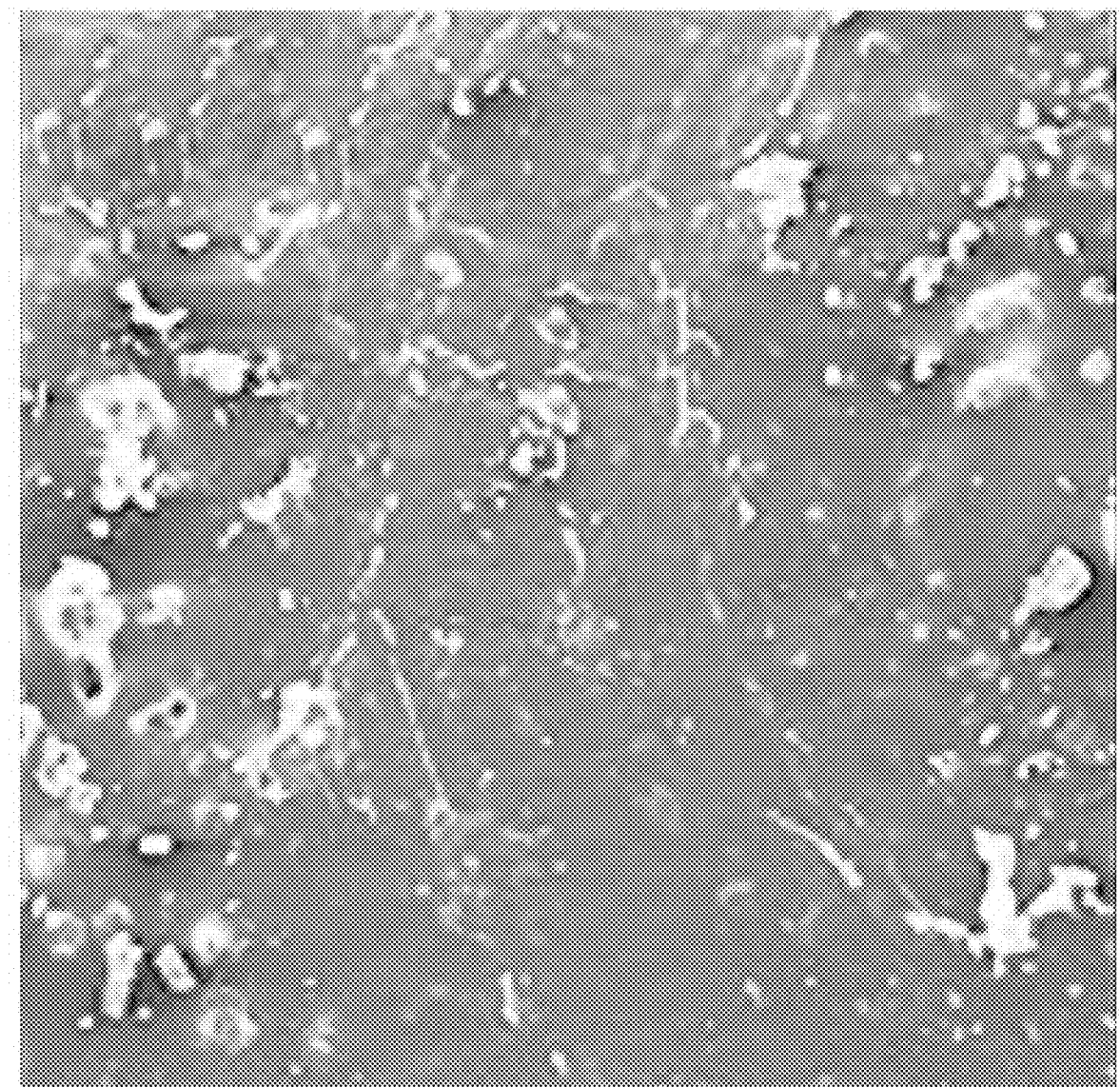
FIG. 8B illustrates a SEM image of the wear track of FIG. 8A at a magnification of 22×, according to certain embodiments.
Figure 8C:
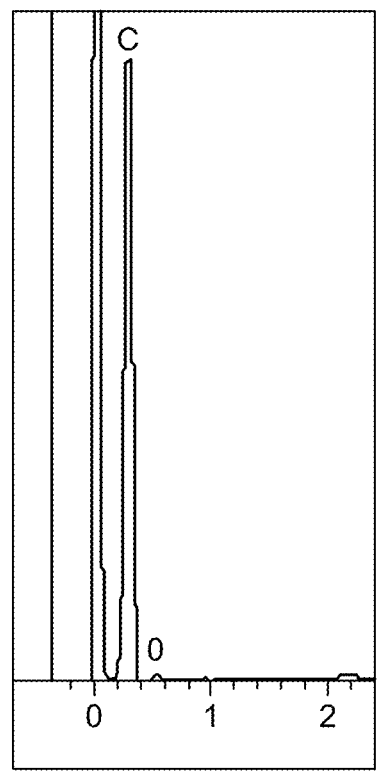
FIG. 8C illustrates an EDX spectrum captured on the wear track of FIG. 8A after the wear test, according to certain embodiments.
Figure 8D:
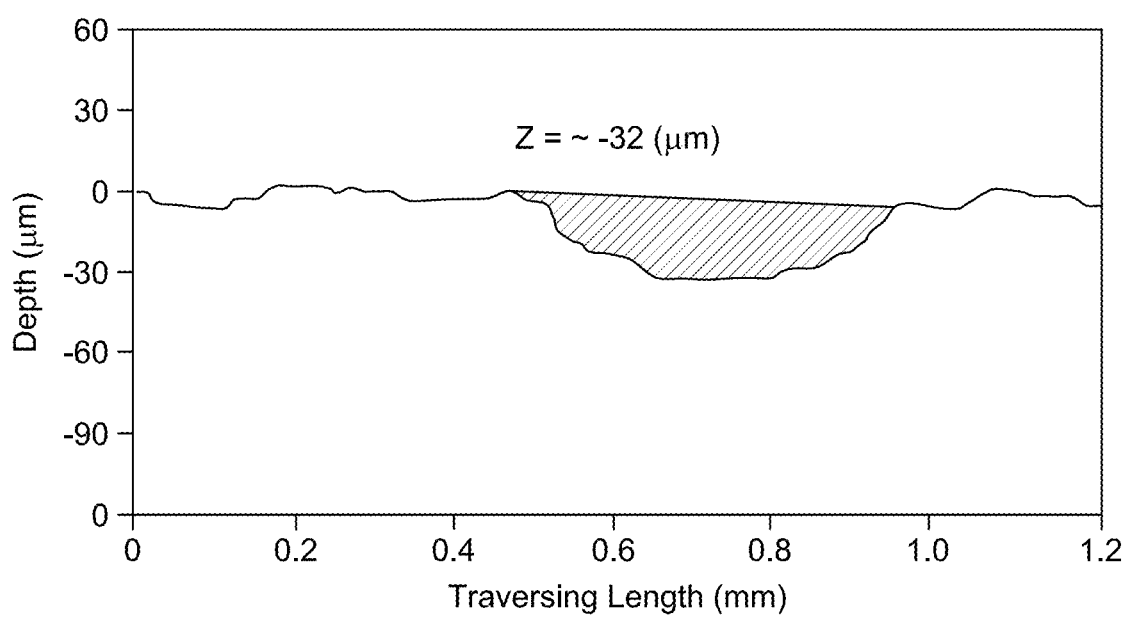
FIG. 8D illustrates 2D profile of the wear track after the test for the 10 wt % crumb rubber coating, according to certain embodiments.
Figure 8E:
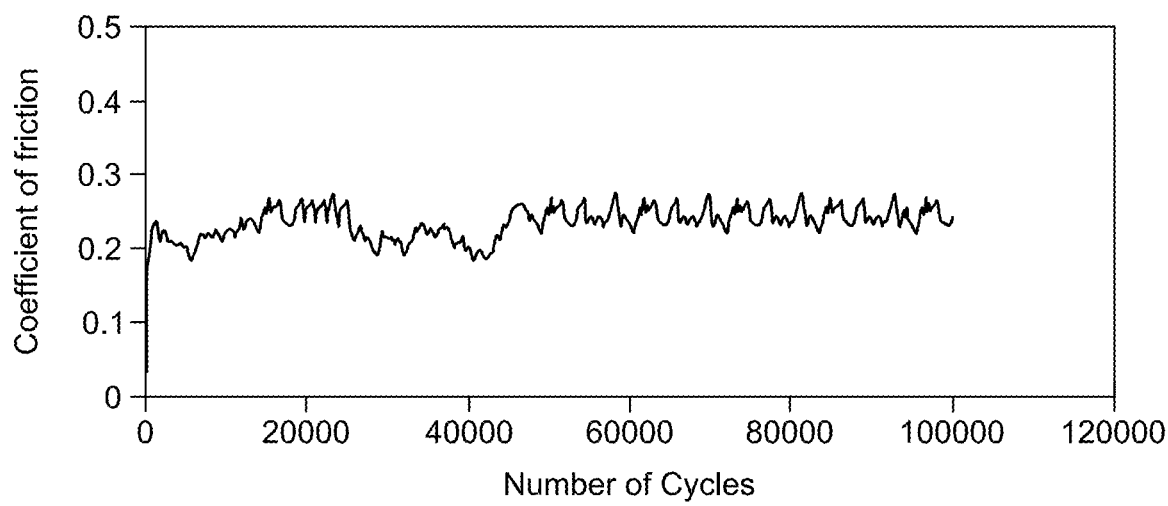
FIG. 8E illustrates a typical frictional plot of a wear test of the 10 wt % crumb rubber coating, according to certain embodiments.
Figure 8F:
FIG. 8F illustrates an optical image of a counterface ball immediately after the wear test before cleaning for the 10 wt % crumb rubber coating, according to certain embodiments.
Figure 8G:
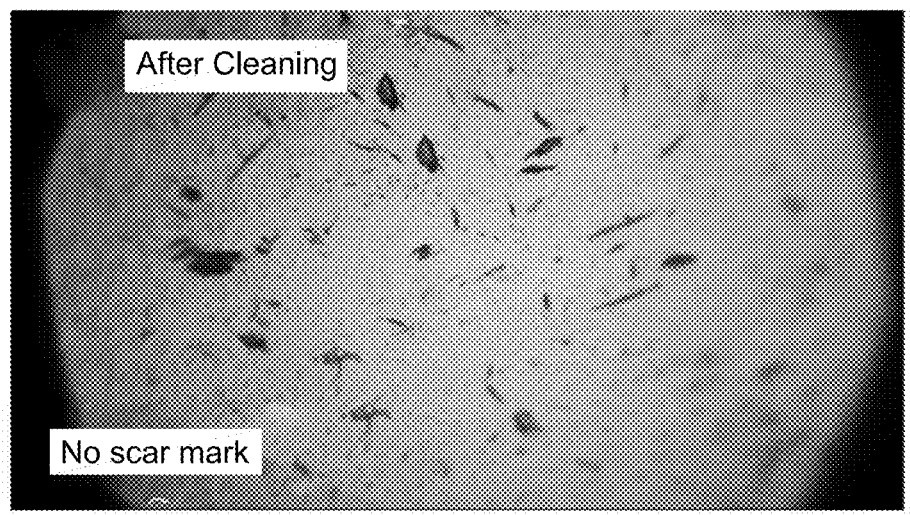
FIG. 8G illustrates an optical image of a counterface ball after the wear test after cleaning for the 10 wt % crumb rubber coating, according to certain embodiments.

Since the UHMWPE/5 wt % of the crumb rubber composite coating failed at 15 N, wear test were conducted on the UHMWPE/10 wt % of the crumb rubber composite coating at a load of 15 N and a sliding speed of 0.1 m/s, due to the higher hardness of the 10 wt % loading as shown in FIG. 2. FIG. 5A-FIG. 5H show the tested sample with the wear track, an optical image of the UHMWPE/10 wt % of the crumb rubber coating, the SEM/EDX analysis of the wear track, a typical frictional plot of the test, optical images of the counterface ball after the test, before and after cleaning with acetone and the 2D profile of the wear track. FIG. 5A shows the photograph of the tested sample with the wear track without any scar marks. FIG. 5B shows a SEM image of the wear track at a magnification of 22× without any scar marks. FIG. 5C illustrates an EDX spectrum captured on the wear track after the wear test without the presence of an iron peak. FIG. 5D illustrates an optical image of the coating showing the distribution of the crumb rubber particles. The crumb rubber particles in the 10 wt % crumb rubber samples are dispersed throughout the particles of the UHMWPE and do not form agglomerates. FIG. 5E illustrates a typical frictional plot of the wear test and FIG. 5F illustrates an optical image of the counterface ball immediately after the wear test before cleaning having no composite transferred onto the ball from the substrate surface during the test. FIG. 5G illustrates an optical image of a counterface ball after the wear test after cleaning, having no scar marks. FIG. 5H illustrates a 2-dimensional (2D) profile of the wear track after the test.

The absence of the iron peak in the SEM/EDX spectrum on the wear track after the wear test confirms the non-failure of the composite coating after 10,000 cycles, which is also evident by the visual inspection of the wear track and the absence of a scar mark on the counterface ball. The depth of the wear track after a 10,000 cycles wear test is found to be approximately 11 µm. The non-failure of the coating can be attributed to the higher hardness (FIG. 2) as compared to the pristine and the UHMWPE/5 wt % of the crumb rubber composite coatings. It is also expected that an increase in the amount and the uniform dispersion of the crumb rubber particles in the polymer matrix results in a more effective anchoring of the UHMWPE polymer chains leading to less polymer pull out, which in turn results in an improved wear life of the coating.

Based on the above result, the UHMWPE/10 wt % crumb rubber coating was tested under an increased load of 17 N. FIG. 6A-FIG. 6F shows the tested sample with the wear track, the SEM/EDX analysis of the wear track, a typical frictional plot of the test, optical images of the counterface ball after the test, before and after cleaning with acetone. As confirmed by the iron peak in the SEM/EDX spectrum and by visual inspection the UHMWPE/10 wt % crumb rubber failed at a load of 17 N. This is also confirmed by a big scar mark observed on the counterface ball resulting from the metal-to-metal contact. This confirmed that the UHMWPE/10 wt % of the crumb rubber composite coating is not able to sustain an increased load of 17 N at a sliding speed of 0.1 m/s.

In view of the above result, wear tests are conducted at a load of 17 N and a sliding speed of 0.1 m/s on the UHMWPE/15 wt % crumb rubber coating to check if the increased content of crumb rubber would help in increasing the load bearing capacity of the composite coating. As shown in FIG. 2, the UHMWPE/15 wt % coating had the highest hardness of the samples tested. FIG. 7A-FIG. 7G show the tested sample with the wear track, the SEM/EDX analysis of the wear track after the test conducted at a load of 17 N on the UHMWPE/15 wt % crumb rubber. It can be clearly observed that the composite coating failed suggesting that the increased content of crumb rubber failed to increase the load bearing capacity of the coating in spite of showing an increased hardness. This can be attributed to the possible agglomerations of the rubber particles due to the increased content resulting in a two phase (soft/hard) morphology, which may have resulted in its poor performance under the increased load.

Example 10: Long Term Wear Tests

Based upon the above evaluation, long term wear tests for a duration of 100,000 cycles, for the UHMWPE/10 wt % of the crumb rubber coating to check its performance at a load of 15 N, were conducted. FIG. 8A-FIG. 8G shows the tested sample with the wear track, the SEM/EDX analysis of the wear track, a typical frictional plot of the test, optical images of the counterface ball after the test, before and after cleaning with acetone and the 2D profile of the wear track. The visual inspection of the wear track, the absence of iron peak in the SEM/EDX spectrum on the wear track and the absence of a scar mark on the counterface ball confirmed that the UHMWPE/10 wt % of the crumb rubber coating did not fail even until 100,000 cycles of wear test at a load of 15 N and a sliding speed of 0.1 m/s. Furthermore, on the inspection of the 2D profile of the wear track after the test of 100,000 cycles, the wear depth did not change significantly as compared to the wear test of 10000 cycles (~11 µm) and was found to be approximately 32 µm, signifying the excellent wear resistance of the coating.

It was observed that the UHMWPE/10 wt % crumb rubber composite coating shows an improved load bearing capacity of 15 N, which in turn results in an increased operating envelope for the UHMWPE composite coatings making them suitable for demanding tribological applications. Furthermore, the results from the current application, provide an economically viable alternative to expensive fillers/reinforcements for UHMWPE coatings with improved mechanical and tribological properties but also present a practical route for recycling used tires.

Numerous modifications and variations of the present disclosure are possible in light of the above teachings. It is therefore to be understood that within the scope of the appended claims, the invention may be practiced otherwise than as specifically described herein.

The invention claimed is:

1. A method of forming a composite coated substrate, comprising:
dispersing crumb rubber particles in a solvent to form a dispersion;
mixing ultra-high molecular weight polyethylene (UHMWPE) into the dispersion and evaporating the solvent to form a composite; and
electrospraying at least one layer of the composite onto a surface of a substrate to form the composite coated substrate,
wherein the crumb rubber particles are dispersed in a matrix of the UHMWPE on the surface of the substrate,
wherein the at least one layer has a thickness of 1-500 um.

2. The method of claim 1, wherein the substrate is subjected to air-plasma treatment prior to coating.

3. The method of claim 1, wherein the substrate is made from a material selected from the group consisting of titanium, gold, cobalt, tantalum, chromium, nickel, and mild steel.

4. The method of claim 1, wherein the composite consists of UHMWPE and crumb rubber particles.

5. The method of claim 1, wherein the UHMWPE has an average particle size of 10-500 um.

6. The method of claim 1, wherein the UHMWPE has a molecular weight (Mw) of at least 1,000,000 g/mol.

7. The method of claim 1, wherein the composite comprises crumb rubber-UHMWPE particles wherein the UHMWPE is interpenetrated with a surface of the crumb rubber particles, and contain a core of crumb rubber particles representing from 0.8 to 0.95 of the total thickness of the crumb rubber-UHMWPE particles.

8. The method of claim 1, wherein the crumb rubber particles have an average particle size of 150-250 um.

9. The method of claim 1, wherein the crumb rubber particles are not agglomerated in the composite coated substrate.

10. The method of claim 1, wherein the composite comprises 0.1-25 wt. % of the crumb rubber particles based on a total weight of the crumb rubber particles and the UHMWPE.

11. The method of claim 1, wherein the composite comprises 5-15 wt. % of the crumb rubber particles based on a total weight of the crumb rubber particles and the UHMWPE.

12. The method of claim 1, wherein the surface of the composite coated substrate is hydrophilic.

13. The method of claim 1, wherein the composite coated substrate has a hardness of at least 8 GPa.

14. The method of claim 1, wherein the composite coated substrate has a hardness of 10-20 GPa.

15. The method of claim 1, wherein the composite coated substrate has a maximum normal load of 15 N.

16. The method of claim 1, wherein the composite coated substrate can withstand up to 100,000 cycles at a load of 15 N and at a sliding speed of 0.1 m/s.

17. The method of claim 1, further comprising, heating the crumb rubber particles to a temperature of 100-300° C. prior to forming the dispersion,
wherein the heating forms microcracks on a surface of the crumb rubber particles.

18. The method of claim 17, wherein the UHMWPE has a polybranched structure and wherein at least one branch of the polybranched structure penetrates a microcrack of the crumb rubber particles to form crumb rubber-UHMWPE particles in the composite.

19. The method of claim 18, wherein the at least one branch of the polybranched structure penetrates the microcrack of the crumb rubber particles at a depth of 1-500 nm in the crumb rubber-UHMWPE particles.

20. The method of claim 1, wherein the solvent is evaporated to form the composite by sonicating and by heating to a temperature 5-20° C. greater than the boiling point of the solvent to interpenetrate the UHMWPE into a surface of the crumb rubber particles.

* * * * *